United States Patent
Goren et al.

(10) Patent No.: US 7,069,025 B2
(45) Date of Patent: Jun. 27, 2006

(54) METHODS AND APPARATUS FOR IDENTIFYING ASSET LOCATION IN COMMUNICATION NETWORKS

(75) Inventors: David P. Goren, Smithtown, NY (US); Christopher D Hook, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 49 days.

(21) Appl. No.: 09/926,516

(22) Filed: Nov. 14, 2001

(65) Prior Publication Data

US 2002/0098852 A1  Jul. 25, 2002

Related U.S. Application Data

(60) Provisional application No. 60/270,254, filed on Feb. 20, 2001, provisional application No. 60/248,357, filed on Nov. 14, 2000.

(51) Int. Cl.
*H04Q 7/20* (2006.01)
*H04Q 5/22* (2006.01)

(52) U.S. Cl. ............... 455/456.2; 455/456.5; 455/517; 455/70; 340/10.42; 340/10.2; 340/825.49; 342/450; 370/445

(58) Field of Classification Search ............ 455/456.1, 455/456.2, 456.5, 456.6, 517, 67.11, 68, 70; 370/445; 342/450; 340/10.1, 825.36, 825.49, 340/572.1, 10.42, 10.41, 10.4, 10.2, 10.3, 340/10.31
See application file for complete search history.

(56) References Cited

U.S. PATENT DOCUMENTS 5,119,104 A  6/1992  Heller ..................... 342/450
5,150,310 A *  9/1992  Greenspun et al. ........ 342/451
5,365,516 A  11/1994  Jandrell ..................... 342/457
5,525,081 A  6/1996  Mardeshich et al. .......... 440/6
5,526,357 A  6/1996  Jandrell ..................... 342/457
5,596,330 A  1/1997  Yokev et al. ............... 342/457
5,764,188 A  6/1998  Ghosh et al. ............... 342/457
5,890,068 A  3/1999  Fattouche et al. ........ 455/456.2

(Continued)

FOREIGN PATENT DOCUMENTS

EP  0748084  11/1996

(Continued)

OTHER PUBLICATIONS

"IEEE Standard Part 11: Wireless Medium Access Control (MAC) and Physical Layer (PHY) Specification. (ISO/IEC 8802-11, ANSI/IEEE STD 802.11-1999) Chapter 7: Frame Formats" ISO/IEC 8802-11, ANSI/IEEE STD 802.11, Aug. 20, 1999 pp. 34-58, XP002206839 pp. 42-43, Paragraph 7.2.1.4 Figure 19.

(Continued)

*Primary Examiner*—Rafael Perez-Gutierrez
(74) *Attorney, Agent, or Firm*—Baker Botts LLP

(57) ABSTRACT

The location of unmodified wireless assets in a wireless communication network may be identified using time differences of arrivals of a communication sequence at different network receivers. Time-stamping devices may include correlator circuits in parallel with signal decoders to time-stamp communication sequences. Cellular wireless networks may be frequency-multiplexed to increase spatial time-stamping density. Tags may be attached to passive assets to provide location identification information to network devices. Locations of assets broadcasting standard 802.11 radio frequency structures may be identified. Noise inherent in correlating a communication sequence may be reduced by using a selected correlation function.

15 Claims, 25 Drawing Sheets

U.S. PATENT DOCUMENTS

| | | | |
|---|---|---|---|
| 6,121,926 A | 9/2000 | Belcher et al. | 342/450 |
| 6,127,976 A | 10/2000 | Boyd et al. | 342/463 |
| 6,150,921 A | 11/2000 | Werb et al. | 340/10.1 |
| 6,268,723 B1 | 7/2001 | Hash et al. | 324/243 |
| 6,308,428 B1 | 10/2001 | Creighton, III | 33/286 |
| 6,317,082 B1 | 11/2001 | Bacon et al. | 342/465 |
| 6,459,704 B1 * | 10/2002 | Jandrell | 370/445 |

FOREIGN PATENT DOCUMENTS

| | | |
|---|---|---|
| WO | 98/16849 | 4/1998 |
| WO | 99/67737 | 12/1999 |
| WO | 00/11590 | 3/2000 |
| WO | 00/14561 | 3/2000 |
| WO | 00/23956 | 4/2000 |
| WO | 00/46771 | 8/2000 |
| WO | 00/48016 | 8/2000 |
| WO | 00/52498 | 9/2000 |
| WO | 01/06401 | 1/2001 |
| WO | 01/07928 | 2/2001 |
| WO | 01/15070 | 3/2001 |
| WO | 01/29574 | 4/2001 |
| WO | 01/43419 | 6/2001 |
| WO | 01/50299 | 7/2001 |
| WO | 01/61465 | 8/2001 |
| WO | 01/61883 | 8/2001 |
| WO | 01/67128 | 9/2001 |
| WO | 0167043 | 9/2001 |
| WO | 0167341 | 9/2001 |
| WO | 01/74021 | 10/2001 |
| WO | 01/82520 | 11/2001 |
| WO | 0182520 | 11/2001 |

OTHER PUBLICATIONS

"IEEE Standard Part 11: Wireless Medium Access Control (MAC) and Physical Layer (PHY) Specification. (ISO/IEC 8802-11, ANSI/IEEE STD 802.11-1999) Chapter 9: MAC Sublayer Functional Description" ISO/IEC 8802-11, ANSI/IEEE STD 802.11, Aug. 20, 1999 pp. 70-97, XP002207974 pp. 70, Paragraph 9-Page 76, Paragraph 9.2.4.

"IEEE Standard Part 11: Wireless Medium Access Control (MAC) and Physical Layer (PHY) Specification. (ISO/IEC 8802-11, ANSI/IEEE STD 802.11-1999) Chapter 11: MAC Sublayer Management Entity" ISO/IEC 8802-11, ANSI/IEEE STD 802.11, Aug. 20, 1999, pp. 123-137, XP002207975 p. 125, Paragraph 11.2.2.4; Figures 67, 68; Table 23.

"IEEE Standard Part 11: Wireless Medium Access Control (MAC) and Physical Layer (PHY) Specification. (ISO/IEC 8802-11, ANSI/IEEE STD 802.11-1999) Chapter 14: Frequency-Hopping Spread Spectrum (FHSS) PHY Specification for the 2.4 GHz . . . " ISO/IEC 8802-11, ANSI/IEEE STD 802.11, Aug. 20, 1999 pp. 148-194, XP002207976 pp. 157, Paragraph 14.3.3.2-p. 160, Paragraph 14.3.3.2.2; Figures 77, 78.

"IEEE Standard Part 11: Wireless Medium Access Control (MAC) and Physical Layer (PHY) Specification. (ISO/IEC 8802-11, ANSI/IEEE STD 802.11-1999) Chapter 15: Direct Sequence Spread Spectrum (DSSS) PHY Specification for the 2.4 GHz Band . . . " pp. 223, Paragraph 15.4.8.4.

* cited by examiner

METHODS AND APPARATUS FOR IDENTIFYING ASSET LOCATION IN COMMUNICATION NETWORKS

CROSS REFERENCE TO RELATED APPLICATION

This claims the benefit of U.S. Provisional Patent Applications Nos. 60/270,254, filed Feb. 20, 2001, and 60/248,357, filed Nov. 14, 2000, both now abandoned which are hereby incorporated by reference herein in their entireties.

BACKGROUND OF THE INVENTION

The present disclosure relates to apparatus and methods for tracking the location of assets in wireless or partially wireless communication networks. In particular, the disclosure relates to identifying asset location using the time-of-arrival (hereinafter, TOA) at a receiver of a communication sequence or sequences broadcast by a movable transmitter. TOA estimation may be referred to as "time-stamping" of a communication sequence.

Precise estimation of communication sequence arrival times may be desirable when mobile asset location is determined using ranging or triangulation techniques in connection with receivers present in a communication network. As the number of assets, the amount of communication traffic, or the rate of time-stamping events in a network increases, time-stamping performance and overall network performance may decrease. Usually, it is not desirable to identify the location of every wireless asset present in a network in connection with every broadcast packet. Networks often operate inefficiently, however, because without time-stamping every received packet, it may be impossible to time-stamp the desired packets.

In some wireless networks, access point architecture may limit network performance. Often, access points do not permit time-stamping processes to be performed quickly enough to generate accurate estimates of wireless asset location.

Wireless communication networks often have a cellular architecture in which adjacent cells operate on different channels. To minimize interference between communication signals, the cells are arranged to maximize the physical distance between the channels. Although this arrangement maximizes the spatial bandwidth available to network users, it often degrades location estimation accuracy by decreasing the density of receivers available for time-stamping on a given channel.

Wireless communication networks are increasingly designed to use 802.11 radio frequency signal structures. As this standard proliferates it will become increasingly valuable to identify the location of wireless assets broadcasting standard 802.11 packets.

Often, it is desirable to identify the location of "passive" assets present in the vicinity of a wireless communication network. For example, it may be desirable to track the location of pallets in a cargo yard. One solution is to attach active tags to the passive assets. Often, tags transmit specialized signals on a fixed schedule and on a single frequency. When a network does not receive a scheduled transmission, location information may be lost. Fixed schedule tags can not "choose" when to transmit and so can not optimally utilize periods of open "air time." Location estimation may therefore be particularly difficult or inefficient in high traffic communication networks. Single frequency tags may not be optimally trackable in multiple frequency cellular networks.

Time-stamping schemes often use correlation-based signal processing techniques (similar to signal decoding techniques). Noise inherent in known correlation techniques (e.g., cross-correlation artifacts) can degrade time-stamping accuracy.

Multiple signal arrivals (hereinafter, "multipath") from a single communication sequence transmission may degrade decoded signal quality and make sequence detection difficult. Multipath may occur when structures near a transmitter produce transmission echoes that arrive at the receiver after the "line-of-sight" signal. The "line-of-sight" (hereinafter, "LOS") signal is the portion of a transmitted signal that traverses the shortest path between transmitter and receiver. The LOS signal may pass through structures. The LOS path may be opaque in the visible spectrum. Multipath may contaminate decoded data signals with false data sequences and make detection of LOS data sequences difficult. Multipath may give rise to false sequences that have stronger signals than LOS signals because LOS signals may be attenuated by structures through which they pass.

It would be desirable, therefore, to provide efficient apparatus and methods for identifying wireless asset location.

It would also be desirable to provide apparatus and methods for accurately identifying wireless asset location.

It would be further desirable to provide apparatus and methods for identifying a location of a wireless asset broadcasting 802.11 signal structures.

It would be still further desirable to provide apparatus and methods for efficiently tagging passive assets for location identification.

SUMMARY OF THE INVENTION

It is an object of this invention to provide improved apparatus and methods for identifying wireless asset location in a wireless communication network.

In accordance with the principles of the invention, apparatus and methods for providing a time-of-arrival estimate of a data signal at a receiver may be provided. In some embodiments, the data signal may be received, demodulated, and decoded into a decoded signal. The decoded signal may be analyzed for sequences favorable for estimating TOA. If favorable sequences are detected, a correlation function may be selected for correlating with the demodulated signal. The correlation function may be selected using rules that may be derived based on correlation properties of data sequences. TOA may be estimated using the correlation function, values of the correlation function, or a combination thereof.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
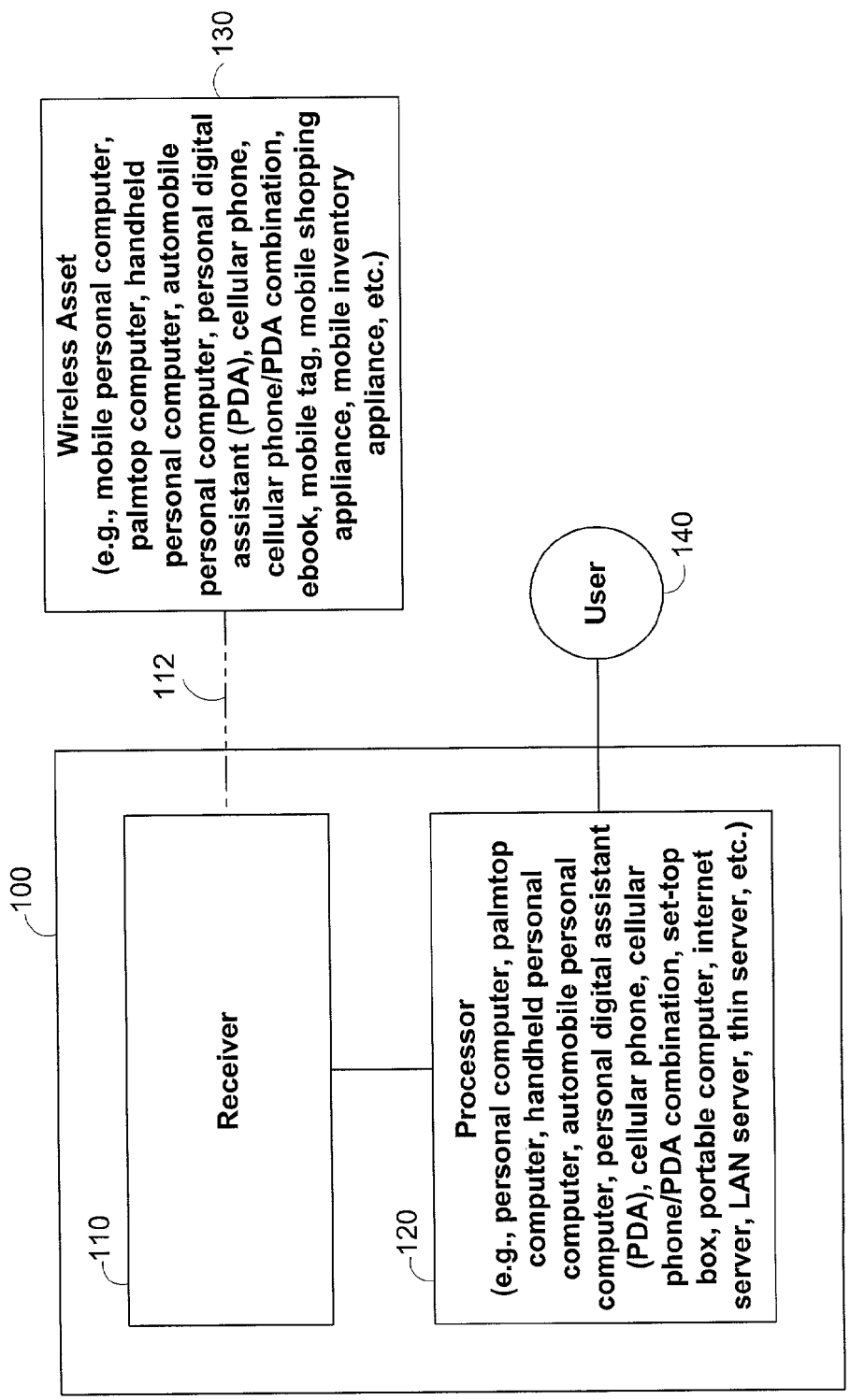
FIG. 1 is a schematic diagram showing an illustrative apparatus that may be used in conjunction with a wireless asset location identification system in accordance with the principles of this invention.

Systems and methods for identifying a location of a wireless asset in a communication network may be provided. Some embodiments of the invention may include a synchronization signal generator and network resources configured to time-stamp communication sequences broadcast by the wireless asset. Each network resource may be in electrical communication with the synchronization signal generator. Each resource may be configured to time-stamp the communication sequence.

The synchronization signal may be used to synchronize clocks present in the network resources. Time-of-arrival estimates (hereinafter, TOA estimates) from the network resources may be used to identify a location of the wireless asset. In some embodiments, the differences between TOA estimates for a communication sequence arriving at different network resources may be used for location identification. Differences in TOA's for a communication sequence arriving at different network resources may be referred to herein as "TDOA's". A TDOA may be used to determine a solution set of possible wireless asset locations. A second TDOA may be used to identify an estimated asset location within the solution set. In some embodiments, hyperbolic trilateration may be used to convert TDOA's into a wireless asset location estimate.

In some embodiments, an IEEE 802.11 communication sequence may be time-stamped. The communication sequence may include 802.11 radio frequency signal structures. The communication sequence may include an 802.11 packet.

Some embodiments of the invention may provide a TOA estimation device for providing a TOA estimate of a communication sequence at a location in a wireless communication network. A TOA estimation device may include one or more receivers for receiving one or more communication sequences. A TOA estimate may be an estimate of the time of arrival of a communication sequence or a portion of a communication sequence. A communication sequence may include a series of information symbols. An information symbol may be a PN code, a CCK symbol, a PBCC symbol, or any other suitable information symbol. In a communication sequence, patterns of information symbols that have high quality autocorrelation properties may be favorable for time-stamping. Patterns of information symbols that have noisy autocorrelation properties may be unfavorable for time-stamping.

The leading edge of a signal associated with a communication sequence or a portion thereof may be defined as a TOA. A peak in a correlation signal (as discussed below) derived from a communication sequence or a portion thereof may be used to define a TOA. Any other suitable feature of a communication sequence or a portion thereof may be used to define a TOA. If multiple receivers in a network use the same TOA definition for a communication sequence, differences between the TOA's may be precisely estimated.

In some embodiments, a TOA estimation device may include a device for receiving radio frequency signals and a first circuit in electronic communication with the radio frequency device. The first circuit may be configured to detect a peak of a correlation function of a received communication sequence.

The first circuit may function as a correlator for detecting portions of the communication sequence that are favorable for TOA estimation. The correlator may be a sliding correlator that multiplies the communication sequence by a selected reference function. A product of the communication sequence and a selected reference function may be used to define a correlation signal.

The first circuit may include a one-, two-, three-, four-, or five-symbol correlator wherein each symbol in each correlator corresponds to an information symbol that may be present in a received communication sequence. A two-symbol correlator may be used to detect a pattern of two consecutive corresponding symbols in the communication sequence. A three-symbol correlator may be used to detect a pattern of three consecutive corresponding symbols in the communication sequence. Correlators of greater "length" may be used to detect longer symbol patterns that may be present in the communication sequence.

The first circuit may include an N-symbol correlator, in which N is any positive integer. The first circuit may include a combination of correlators of different lengths. In some embodiments, the system may include correlators arranged in series. In some embodiments, the system may include correlators arranged in parallel.

In some embodiments, a TOA estimation device may include a second circuit configured to decode the communication sequence received by a receiver. For example, in wireless 802.11b compatible networks, a one-bit (Barker sequence) correlator is often used as a decoder. (As used herein, the term 802.11 may include any of the 802.11 family of wireless communication network specifications, including 802.11a and 802.11b.

In some embodiments, a TOA estimation device may include a third circuit configured to filter multipath signal components out of correlator output signals (which may be referred to as correlation signals). Multipath signals are reflections of a communication signal from structures. Multipath signals are often received after the corresponding direct or "line of sight" signal is received. Numerous multipath signals may be generated by reflections of a given line of sight signal. The multipath signals may be stronger than the line of sight signals because line of sight signals are attenuated during propagation through structures. It may, therefore, be necessary to identify the line of sight contribution to correlation signals.

In some embodiments, a TOA estimation device may include a fourth circuit configured to output a signal indicative of a time-of-arrival estimate. In some embodiments, a TOA estimation device may include a fifth circuit configured to parse a mobile asset device identification code in said communication sequence. A mobile asset identification code may include a Media Access Control (hereinafter, MAC) address. A mobile asset identification code may include an Internet Protocol (hereinafter, "IP") address. The fifth circuit may perform conversions between MAC addresses and IP addresses. Conversions may be performed, for example, using an Address Resolution Protocol or a Reverse Address Resolution Protocol. A mobile asset identification code may be selected by a system administrator. A mobile asset identification code may be an 802.11 identification code. A mobile asset identification code may be a unique code. A mobile asset identification code may be a non-unique code.

In some embodiments, a TOA estimation device may include circuitry for demodulating the communication sequence. In some embodiments, a TOA estimation device may include an antenna for receiving the communication sequence. In some embodiments, a TOA estimation device may include a central processing unit for executing tasks required for time-of-arrival estimation. The central processing unit may be a personal computer. In some embodiments, a TOA estimation device may include a radio module (such as those available under the names CompactFlash™ of CompactFlash Association, P.O. Box 51537, Palo Alto, Calif.; PC Card™ of PCMCIA, 2635 N. First St. Suite 209, San Jose, Calif. 95134; and Mini PCI, a form factor controlled by PCI S.I.G.).

In some embodiments, the invention may include a network of devices that include receivers configured to selectively identify a mobile asset location by "selective listening." The receivers may receive a communication sequence from the mobile asset and optionally estimate the location of the asset if the asset has an identifier corresponding to a selected identifier. The selected identifier may be a unique identifier. The selected identifier may be a non-unique identifier. A selected identifier may be selected by a user of the system. A selected identifier may be stored in memory of a network resource. A network transmitter may ping a selected wireless asset to cause the asset to broadcast a communication sequence. The network may then time stamp the sequence.

In some embodiments, the invention may include a network of TOA estimation devices. Each device may include a receiver configured to operate at a particular frequency. The network may include multiple TOA estimation devices configured to provide time-stamping of signals propagating at different frequencies. A group of TOA estimation devices may be assigned to the same frequency. The assigned frequency of one group may be different from the assigned frequency of the other groups. The devices may be distributed in a cellular configuration. Methods for identifying the location of a wireless asset that involve broadcasting or receiving on different frequencies may be referred to herein as "frequency multiplexing" methods.

The network may be configured to receive a communication sequence from a wireless asset on a first frequency using one or more TOA estimation devices from a first group. The network may then receive a communication sequence from the wireless asset on a second frequency using one or more TOA estimation devices from a second group. One or more additional TOA estimation device groups operating at one or more corresponding additional frequencies may be used to receive one or more corresponding additional communication sequences from the wireless asset. In some embodiments, the wireless asset transmissions may progress through all or some of the available network frequencies in a sufficiently short time period to ensure that the wireless asset location remains substantially unchanged during the period. Each TOA estimation device may time-stamp the communication sequence received on the respective frequency of the device.

One or more estimates of wireless asset location may be calculated from TOA estimates produced by the TOA estimation devices. A TDOA may be derived from a pair of TOA's selected from the same or different groups. A TDOA may be derived from TOA estimation devices that are favorably located for identifying the mobile asset location. Favorably located devices may include those devices near the wireless asset. Favorably located devices may include devices that are distributed spatially in a pattern favorable to location identification calculations (for example, in a triangular pattern surrounding the mobile unit).

In some embodiments, a preliminary location identification calculation may be made to provide a coarse estimate of wireless asset location. In some of these embodiments, a high-precision estimate may be made using time-of-arrival estimates from TOA estimation devices selected based on the preliminary estimate of mobile asset location.

In some embodiments, a TOA estimation device may be configured to receive communication signals on more than one frequency. For example, the device may be configured to receive communication sequences on all frequencies available in the network. The device may include at least one receiver configured to receive a communication sequence on each frequency available in the network. In some embodiments, all TOA estimation devices in a network may be configured to receive communication sequences on all available frequencies. In these embodiments, a wireless asset operating on any one of the available frequencies may broadcast a communication sequence that may be time-stamped by all of the TOA estimation devices in the network.

In some embodiments that include TOA estimation devices configured to receive communication sequences on multiple frequencies, the devices may include a primary receiver and at least one auxiliary receiver. The primary receiver may be configured to receive a communication sequence on an assigned frequency. The auxiliary receiver may be configured to alternate through a range of frequencies (e.g., all available frequencies in the network). The network may include a central controller to force auxiliary receivers to operate at a selected frequency at a particular time. For example, the controller may cause all auxiliary receivers to simultaneously progress through a sequence of different frequencies. The different frequencies may include all available frequencies. During an interval in which all auxiliary receivers are switched to a particular frequency, potentially all TOA devices in the network may be used to time-stamp a communication sequence broadcast by a wireless asset on that frequency.

Some embodiments of the invention may include wireless assets configured to broadcast a series of communication sequences for TOA estimation. In some of the embodiments, the wireless asset may broadcast a series of communication sequences using a series of different frequencies used by the network receivers. In some of these embodiments, wireless assets may be configured to repeatedly transmit a communication sequence for TOA estimation at a given frequency. Communication sequences that are transmitted by a wireless asset for the purpose of identifying the location of the asset may be referred to herein as location identification information.

Some embodiments of the invention may include a tag that may be attached to a mobile article that may be present in or near a communication network. Tags are described in U.S. Patent Application No. 60/248,357, filed Nov. 14, 2000, which is hereby incorporated by reference herein in its entirety. The tag may be configured to provide location identification information to the network. The location identification information may include data in any format suitable for the network. For example, the tag may transmit 802.11 compatible data. In some embodiments, a tag may be configured to wait a predetermined period of time, detect the presence of radio frequency energy (e.g., using an energy detector) on a network channel, and, if the radio frequency energy is substantially less than a predetermined threshold, transmit the location identification information to the network. The tag may wait in a "sleep" mode. The sleep mode may require reduced power. The sleep mode may be interrupted by a timer within the tag. The sleep mode may be interrupted by a "wake-up" call from a network terminal.

The tag may be configured to switch to a different network frequency if radio frequency energy on the first tested frequency is not less than the threshold. In some embodiments, the tag may continue to switch to different network frequencies until a clear channel is detected. When a clear channel is detected, the tag may transmit location identification information to network receivers. In some embodiments, the tag may be configured to wait until a given channel is clear before broadcasting location identification information.

In some embodiments, the tag may be configured to transmit location identification information on multiple frequencies for frequency multiplexing purposes. For example, a tag may include multiple transmitters to broadcast location identification information on more than one channel in a cellular network. In some embodiments, a tag may broadcast location identification information on multiple channels sequentially, for example, using a single tunable transmitter.

In some embodiments, the tag may transmit asset identification information. Asset identification information may include information identifying the tag itself. Asset identification information may include information identifying the mobile article to which the tag is attached. Asset identification information may include a MAC address, a portion of a MAC address, an IP address, a portion of an IP address, or any suitable unique or non-unique information for identifying the tag or the mobile article to which it is attached.

In some embodiments, the tag may be configured to receive data from a network transmitter. In some of these embodiments, the tag may be configured to receive a wake-up signal from a network terminal.

The invention may include methods and/or apparatus for estimating a TOA of a communication sequence at a receiver. TOA estimation techniques are discussed in U.S. Provisional Application No. 60/270,254, filed Feb. 20, 2001, which is hereby incorporated by reference herein in its entirety. The communication sequence may be present in a data signal or a portion of a data signal. In some embodiments, the invention may include methods for receiving a data signal, demodulating the data signal (e.g., to yield a communication sequence), forming a decoded signal from the data signal (e.g., to yield a bit sequence), and estimating a TOA of the data signal using a selected or preselected correlation function.

In embodiments using a correlation function to estimate a TOA, the correlation function may comprise a representation of the communication sequence and a selected reference signal. The correlation function may be evaluated over a selectable portion of the data signal. The data signal, which may be buffered as necessary, and the reference signal may be combined in a way that allows the correlation function to have a maximum value when the reference signal most strongly correlates with the data signal or a portion of the data signal. The time (relative to the beginning of the data signal or any other temporal reference) at which such a maximum occurs may be defined as a TOA of the data signal.

The data signal may be a signal that is encoded to be recognized by a TOA estimation device. For example, a preselected communication sequence favorable for time-stamping may be inserted into a data signal to improve time-stamping accuracy. A TOA estimation device that recognizes the encoded data signal may use a preselected reference signal to generate a high quality correlation signal when correlated with the preselected communication sequence. In embodiments of the invention configured to receive known communication sequences, sequences of PN codes, CCK symbols, PBCC symbols, or OFDM signals may be time-stamped. In these embodiments, the preselected reference signal may include symbols selected from PN codes, CCK symbols, PBCC symbols, or OFDM signals. A data signal may be encoded for time-stamping, for example, by setting a symbol in a data signal header (e.g., an 802.11 packet header) or data packet to a predetermined value. In some embodiments, the data signal may be encoded to instruct a TOA estimation device to time-stamp the sequence.

The data signal may be a signal that is not encoded to be recognized by a TOA estimation device. When a non-encoded signal is received, the data signal may be monitored to detect communication sequences that may be favorable for correlation using one or more stored reference signals. When a potentially favorable communication sequence is detected, a reference signal known to strongly correlate with the detected sequence may be combined with the communication sequence to produce a correlation signal. Embodiments of the invention that monitor data signals for favorable communication sequences may detect sequences of Barker codes, PN codes, spectrum spreading codes (e.g., DSSS chipping codes), or any other suitable codes.

In some embodiments of the invention, a TOA estimate may be determined by maximizing or minimizing the value of the correlation function with respect to a TOA parameter or estimator. For example, a TOA estimate may be defined as the maximum likelihood estimate (or "peak") of an independent variable of the correlation function.

In some embodiments of the invention, a TOA estimate may be used to calculate a time difference between arrival of a communication sequence and a portion of a synchronization signal. In some embodiments, a TOA estimate may be used to calculate a time difference between a communication sequence and a reference portion of a clock signal. The clock signal may be generated by a clock internal to the TOA estimation device. The clock signal may be generated by a clock external to the TOA estimation device. In some embodiments of the invention, a TOA estimate may be used to calculate a time difference between a communication sequence received at a first receiver and the same communication sequence received at a second receiver. In some embodiments, a TOA estimate may be used to calculate a time difference between a first communication sequence and a second communication sequence. The first and second communication sequences may be received at the same or different receivers.

Some embodiments of the invention may provide for the filtering or removal of multipath signal components from the correlation signal. Multipath may be removed by detecting the leading edge of a group of possibly overlapping peaks in a correlation signal. Multipath may be separated from line of sight correlation signal components using channel estimation. In embodiments using channel estimation, the communication channel may be modeled as a series of discrete impulse functions in which the first impulse is assumed to be the line-of-sight impulse. A multipath-free ideal correlation signal may be used in conjunction with the actual correlation signal to construct an estimate of the channel. Using the estimated channel, line of sight and multipath impulses may be separated.

In some embodiments of the invention, systems or system components for estimating a TOA of a communication sequence may be provided. Some of these embodiments may comprise apparatus for receiving, demodulating, decoding, buffering, processing, or filtering data signals. Some embodiments may comprise apparatus for outputting a TOA estimate to other network resources. Some embodiments may include multiple correlators. In some of these embodiments, correlators may be arranged in parallel with each other.

Some embodiments of the invention may include circuits for estimating a TOA of a communication sequence at a receiver in a communication network. The circuitry may include a carrier tracking circuit. The circuitry may include a timing loop. The carrier tracking circuit may be used to adjust the oscillating frequency of a receiver used to receive the radio signals.

The circuitry may include a chipping code correlator. The chipping code correlator may decode a spread spectrum communication sequence (e.g., a direct spread spectrum communication sequence) into a series of decoded binary symbols. The chipping code correlator may use a correlation function to decode the communication sequence. The correlation function may include a sequence of symbols that match the chipping code of the communication sequence. The chipping code correlator may operate on signals output from the carrier tracking circuit. Output from the chipping code correlator may be fed back to the carrier tracking circuit for tracking circuit control.

The circuitry may include a time-stamping circuit. The time-stamping circuit may use a correlation function or functions in conjunction with the communication sequence to generate correlation signals. The time-stamping circuit may use a correlation signal for estimating the time-of-arrival of the communication sequence. The time-stamping circuit may include circuitry for separating multipath correlation signal components from line of sight correlation signal components. The time-stamping circuit may operate on output from the carrier tracking circuit.

The circuitry may include a receiver interface. The receiver interface may be a MAC interface. In some embodiments, a carrier tracking circuit, a chipping code correlator, and a receiver interface may be connected in series. In some embodiments, the time-stamping circuit may receive output from both the carrier tracking circuit and the correlator. Output from the tracking circuit may be provided to the time-stamping circuit via a correlator bypass. In some of these embodiments, output from the tracking circuit may be used in conjunction with output from the correlator to detect sequences in the communication sequence for use in TOA estimation. The output of the time-stamping circuit may be connected to the receiver interface for communication with network resources.

Some embodiments may include a decoder circuit connected to the output of the correlator circuit. The decoder circuit may decode the correlator circuit output to generate a series of binary information symbols, for example, for low data communication rates. The decoder circuit may be connected to the output of the carrier tracking signal. The decoder may decode the tracking circuit output to generate a series of binary information symbols, for example, for high data communication rates.

Some embodiments may include a descrambler circuit. The descrambler circuit may receive decoded signals and output descrambled signals to the receiver interface.

The invention may include apparatus and/or methods for identifying a location of a wireless asset using network resources configured to time-stamp a communication sequence broadcast by the asset. In some embodiments, the time-stamping network resources may include TOA estimation devices.

In some embodiments, a TOA of a communication sequence broadcast by a wireless asset may be estimated by a TOA estimation device. The TOA may be estimated using a selected correlation function. The TOA of the same communication sequence may then be estimated at a second TOA estimation device.

The TDOA (time-difference-of-arrivals) of the two TOA's may be used to define a set of possible locations from which the communication sequence may have been transmitted. Techniques for identifying a location of a wireless asset using time-differences-of-arrivals are described in U.S. Provisional Patent Application No. 60/248,357, filed Nov. 14, 2000, which is hereby incorporated by reference herein in its entirety. The set may be a hyperbolic curve. In some embodiments, each TOA estimation device may have an internal clock, or counter, for quantifying a TOA. Clocks that may be included in TOA estimation devices in a network may be synchronized or calibrated to permit the calculation of TDOA's derived from TOA's acquired at different TOA estimation devices.

A TDOA generated by a first TOA estimation device pair may be referred to herein as the first TDOA. A set of possible locations corresponding to the first TDOA may be referred to as a first solution set. Additional location information may used in conjunction with the first solution set to identify the location of the asset. In some embodiments, the additional location information may be acquired sufficiently rapidly to ensure that only small changes in the location of the asset may occur during acquisition of location identification information at TOA estimation devices.

Additional location information may include, for example, at least one additional TDOA solution set. The additional TDOA solution set may define a second hyperbolic curve that intersects with the first hyperbolic curve. The additional TDOA solution set may be derived from TOA estimation devices that are different from the TOA estimation devices of the first pair. The additional TDOA solution set may be derived from one TOA from the first pair and one TOA from a TOA estimation device not included in the first pair. Many additional TDOA solution sets may be used. The identity of the asset location may be defined as the most likely or most precisely estimated intersection of the two solution sets. In some embodiments, asset location may be identified using a least squares estimate of the intersection. In some embodiments, asset location may be identified using a maximum likelihood estimator of the intersection.

Additional location information may include a distance (or range) estimate from a TOA estimation device external to the original TOA estimation device pair. Range may be determined by receiving a communication sequence from the mobile asset when both send- and receive-time are known. Range may be determined by transmitting a signal to the mobile asset from the TOA estimation device, receiving an "echo" signal from the mobile asset, and calculating the range using the round trip travel time. For example, in an 802.11 communication network, the echo signal may be an 802.11 acknowledgment frame (an "ACK"). In some embodiments, a delay between receipt of the transmitted signal and broadcast of the echo signal may be precisely controlled to provide a precise round-trip travel time estimate. Range may be determined by receiving a communication signal from the wireless asset and estimating range using signal strength attenuation. Range may be determined using any other suitable means.

Additional location information may include physical, geographic, or geometric restrictions on the location of the mobile asset. For example, the first TDOA may pass through several sectors of the network. If it is known that the mobile asset is not present in one or more of the sectors, those sectors may be ruled out as possible locations and the remaining sectors may be used to identify the asset location.

In some embodiments of the invention, TDOA may be defined as the average of multiple differences between TOA's from a given pair of TOA estimation devices. For example, a first TOA estimation device may receive a communication sequence from a mobile asset. The first TOA estimation device may generate three different TOA's. A second TOA estimation device may receive the communication sequence from the mobile asset and generate three corresponding TOA's. Three TDOA's may be generated by calculating differences from the three pairs of corresponding TOA's. The three TDOA's may then be averaged and defined as an effective TDOA. The successive TOA's at each TOA estimation device may be generated by repetitive application of the same correlation function to the communication sequence, application of different successive correlation functions, by the application of a single correlation function that generates multiple TOA estimators (see below), or by any other suitable method.

In some embodiments, when multiple TDOA's are generated for a received communication sequence (for example, when multiple independent TOA estimation device pairs receive the communication sequence), it may be necessary to find the intersection of more than two solution sets. When more than two solution sets are present, asset location may be determined by using least squares, maximum likelihood, or any other suitable method for estimating the most likely identity of the location.

When more than two solution sets are present, it may be necessary to discard one or more of them. For example, in some embodiments a noisy solution set may be discarded if noise associated with underlying TOA data is above a predetermined threshold. Some embodiments may discard a solution set that is an "outlier" relative to other solution sets derived for the same communication sequence. In embodiments that use maximum likelihood estimation to determine location identity, each solution set may be weighted according to the amount of noise present in the solution set. In this manner, more noisy TDOA solution sets may be discounted relative to less noisy TDOA solution sets.

Some embodiments of the invention may include a timing cable for synchronizing TOA estimation device clocks in a network. In some of the embodiments, the cable may provide a high frequency sine wave. In some of these embodiments, the cable may provide a high frequency square wave. The synchronization signal may be generated by a network resource. The synchronization signal may be multiplied by the TOA estimation device, for example, using a phase-locked loop. At the TOA estimation device, the signal may be amplified, filtered, wave-shaped, or processed in any other suitable manner. The signal may be processed to produce a digital signal configured to drive a digital counter. The digital counter may serve as a TOA clock for TOA estimation devices in a communication network.

In some embodiments, TOA estimation device clocks in a network may be synchronized by periodically modulating the synchronization signal. A periodic modulation may be used as a global clock reset. A demodulator in a TOA estimation device may be used to detect the periodic modulation. The demodulator may reset the digital counter. In some embodiments, the periodic modulation may be accomplished by removing the high frequency components of the signal for a selected number of cycles or pulses. A re-triggerable one-shot with a timeout greater than a single pulse may be used to detect the missing pulses and generate the clock reset. A TOA estimation device may include a large counter. For example, the counter may have as many as 32 bits. In some embodiments, the counter may have greater than 32 bits.

Some embodiments of the invention may include a calibration process to compensate for differing fixed delays associated with individual TOA estimation devices. These delays may include, but are not limited to, delays in receivers and cables. Delays may be quantified and used to adjust wireless asset location estimates calculated using TOA estimates generated by the TOA estimation devices. In some embodiments, delays may be stored in memory.

Illustrative examples of embodiments in accordance with the principles of the present invention are shown in FIGS. 1–24.

FIG. 1 shows illustrative TOA estimation device 100 including receiver 110 and processor 120. TOA estimation device 100 may include a transmitter for transmitting signals to a wireless asset such as asset 130. In some embodiments, TOA estimation device 100 may be, or may be part of, a wireless network access point such as an 802.11 compatible access point or any other suitable access point. In some embodiments, device 100 may not include components normally associated with an access point, such as a transmitter. Receiver 110 may receive communication signal 112 from a wireless asset such as 130. Wireless asset 130 may be a mobile personal computer, palmtop computer, handheld personal compute, automobile personal computer, personal digital assistant (PDA), cellular phone, cellular phone/PDA combination, wireless tag, wireless shopping appliance, wireless inventory appliance, or any other device suitable for transmitting a wireless communication signal. Wireless asset 130 transmit communication signals via wires.

Receiver 110 may include any hardware, firmware, or software necessary for receiving, demodulating, and decoding communication signal 112 from wireless asset 130. In some embodiments, signal processing tasks may be distributed or shared between receiver 110 and processor 120. For example, receiver 110 may demodulate communication signal 112 and processor 120 may perform decoding and TOA analysis tasks. In some embodiments, processor 120 may receive a communication signal 112 from receiver 110, demodulate the signal, and carry out TOA analysis tasks using suitable signal processing and/or analysis hardware or software. In some embodiments, the tasks of receiver 110 and processor 120 may be integrated into a single component (e.g., in an access point).

Processor 120 may be associated with, for example, a personal computer, palmtop computer, handheld personal computer, automobile personal computer, personal computer, personal digital assistant (PDA), cellular phone, cellular phone/PDA combination, set-top box, portable computer, internet server, network server, thin server, or any other device suitable for processing communication signals or supporting signal analysis tools.

User 140 may be in communication with system 100 via any suitable wired or wireless means. In some embodiments of system 100, a user such as 140 may interact with processor 120 via a keypad, keyboard, touchpad, or any other suitable interface. User 140 may be a client or host processor.

Figure 2:
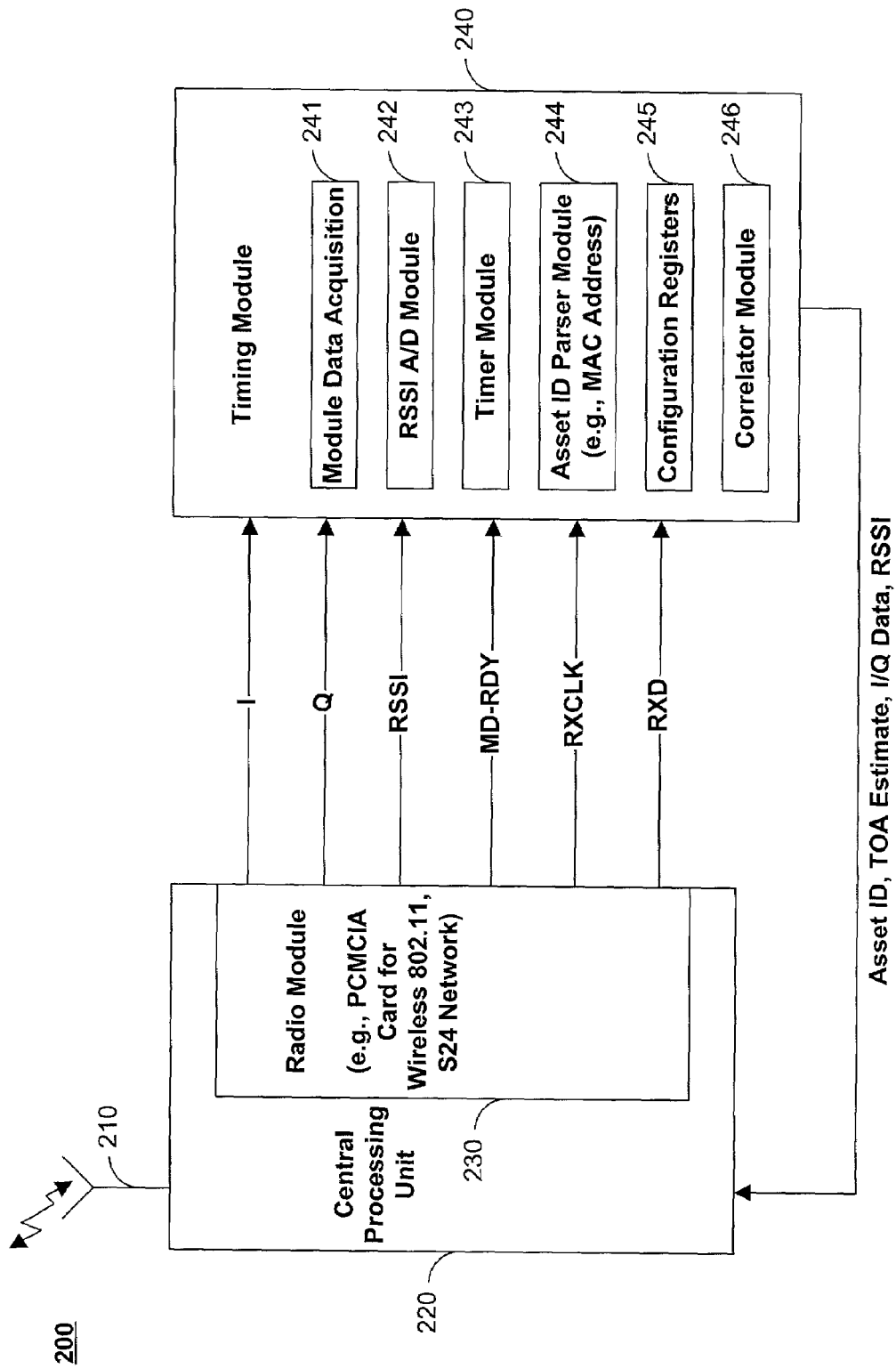
FIG. 2 shows another illustrative apparatus that may be used in conjunction with a wireless asset location identification system in accordance with the principles of this invention.

FIG. 2 shows illustrative TOA estimation device 200, which may provide functions similar to those described in connection with TOA estimation device 100. TOA estimation device 200 may include antenna 210. Antenna 210 may receive wireless signals from a wireless asset. In some embodiments, antenna 210 may transmit wireless signals to a wireless asset. In some embodiments, TOA estimation device 200 may communicate TOA estimation information to a user via wired media. In some embodiments, TOA estimation device 200 may communicate TOA estimation information to a user via wireless media. In some embodiments, TOA estimation device 200 may not include transmission capabilities.

In some embodiments, central processing unit 220, which may interact with radio module 230 and/or high resolution timing module 240, may demodulate signals received by antenna 210, decode the signals, perform serial or parallel correlation tasks, perform hybrid serial-parallel correlation tasks, and provide buffering, data manipulation, and data formatting as necessary to generate or output TOA estimates for a communication sequence that system 200 receives. Processing unit 220 may use any suitable signal processing and/or analysis hardware or software.

In some embodiments of the invention, radio module 230 may provide in-phase and quadrature radio signal components, I and Q, respectively to timing module 240, which may be a high resolution timing module. Radio module 230 provide auxiliary signals to timing module 240. For example, radio module 230 may provide RSSI signal (e.g., for measuring signal strength), MD-RDY signal (e.g., for framing data), RXCLK signal (e.g., for clocking data), and RXD signal (e.g., for communicating received data).

In some embodiments, timing module 240 may include data acquisition module 241, RSSI A/D module 242, timer module 243, asset ID parser module 244, configuration registers 245, correlation module 246, and any other suitable modules. Data acquisition module 241 may acquire communication sequences from signals I and Q. Data acquisition module 241 may convert an analog signal to a digital signal. Timer module 243 may include an oscillator and a counter. Timer module 243 may provide a time reference for time stamping a communication signal received by system 200. Timer module 243 may be used to time-stamp signals transmitted by radio module 230. Time-stamping of a transmitted signal may be used in conjunction with a TOA of a received signal to estimate round trip travel time of a signal between TOA estimation device 200 and a wireless asset. Timer module 243 may be synchronized with other timer modules in TOA estimation devices that may be present in a network so that a difference between two TOA's received at different TOA estimation devices may be calculated. In some embodiments, the timer modules may receive a synchronization signal from a network resource. Asset ID parser module 244 may be present, for example, for parsing wireless asset identification information that may be present in the received communication sequence (e.g., a MAC address). Parser module 244 may include data filters to parse the identification information. Configuration registers 245 may be present. Configuration registers 245 may be used, for example, for storing wireless asset identification information for selective time-stamping (e.g., as discussed above). Correlator module 246 may be present for generating TOA estimates by applying correlation functions to communication sequences. Correlator module 246 may include multi-path processing components.

In some embodiments, timing module 240 may provide an asset ID, a TOA estimate, I/Q data, RSSI, or any other suitable information to central processing unit 220. Unit 220 may process information received from timing unit 240. Unit 220 may provide information such as asset ID, a TOA estimate, I/Q data, RSSI, signal strength, round trip propagation time, distance to a wireless asset, or any other suitable information to other network resources by wireless or wired means. Unit 220 may provide an asset ID and a TOA to a centralized asset location identification processor for the calculation of TDOA's.

Figure 3:
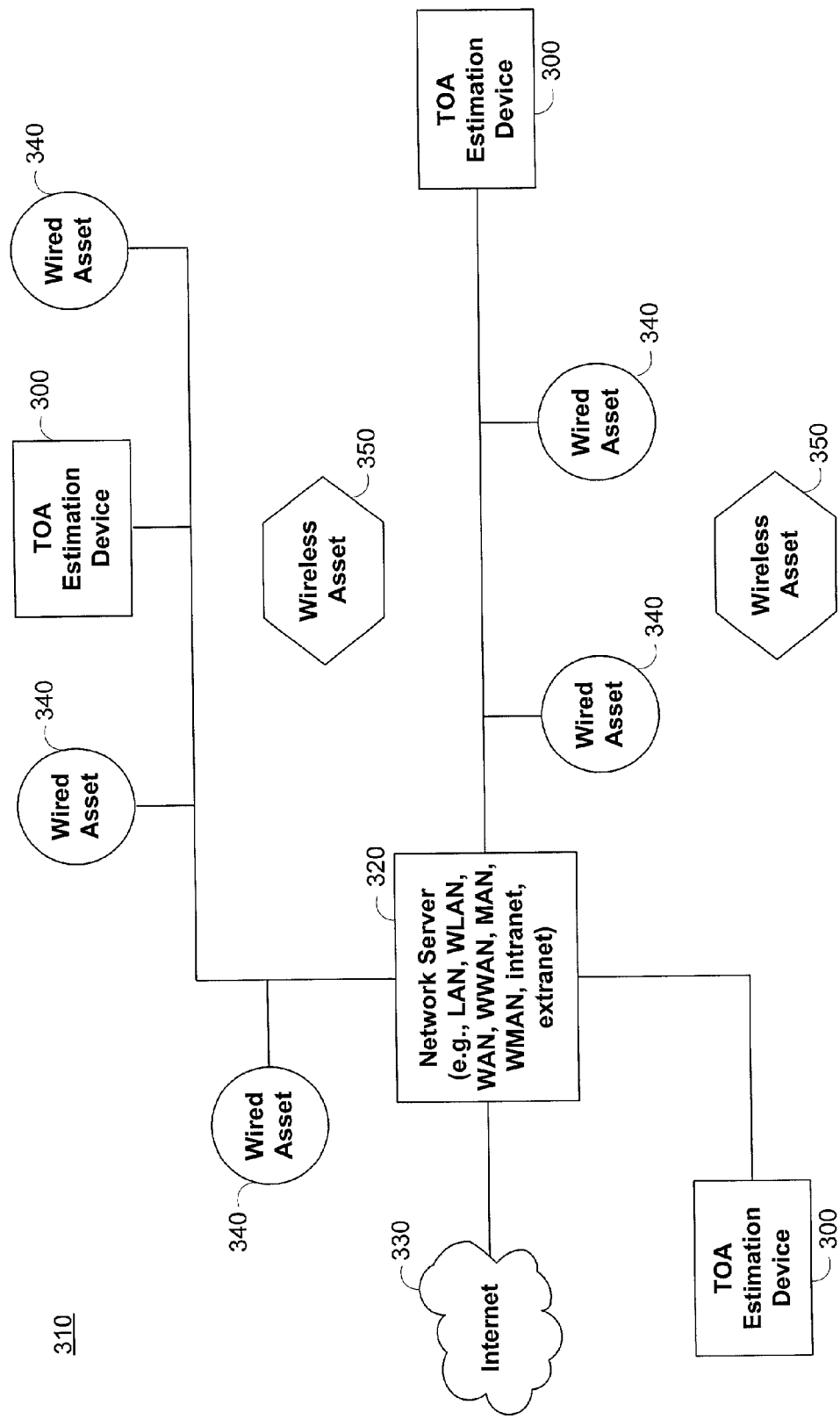
FIG. 3 is a schematic diagram showing an illustrative communication network using apparatus such as those shown in FIGS. 1 and 2.

FIG. 3 shows TOA estimation device 300, which may be similar to TOA estimation devices 100 and 200, integrated into communication network 310. Communication network 310 may be supported by network server 320. Communication network 310 may be a local area network, wide area network, a metropolitan area network, an intranet, an extranet, any other type of communication network, or any wireless or partially wireless form of any such network. Network server 320 may be in communication with internet 330 or any other electronic communication network. Network 310 may include wired assets 340. Features such as TOA estimation device 300, server 320, Internet 330, wired assets 340, and wireless assets 350 may be referred to herein as network resources. A wired asset 340 may be a personal computer, palmtop computer, handheld personal computer, a personal data assistant, a set-top box, a portable computer, an Internet server, a LAN server, a thin server, or any other suitable processing device. One or more of TOA estimation devices 300 may estimate the TOA of signals received from wireless assets such as 350. Network server 320, one of wired assets 340, one of TOA estimation devices 300, or any other suitable network resource may generate a synchronization signal for synchronizing clocks that may be present in TOA estimation devices 300.

Figure 4:
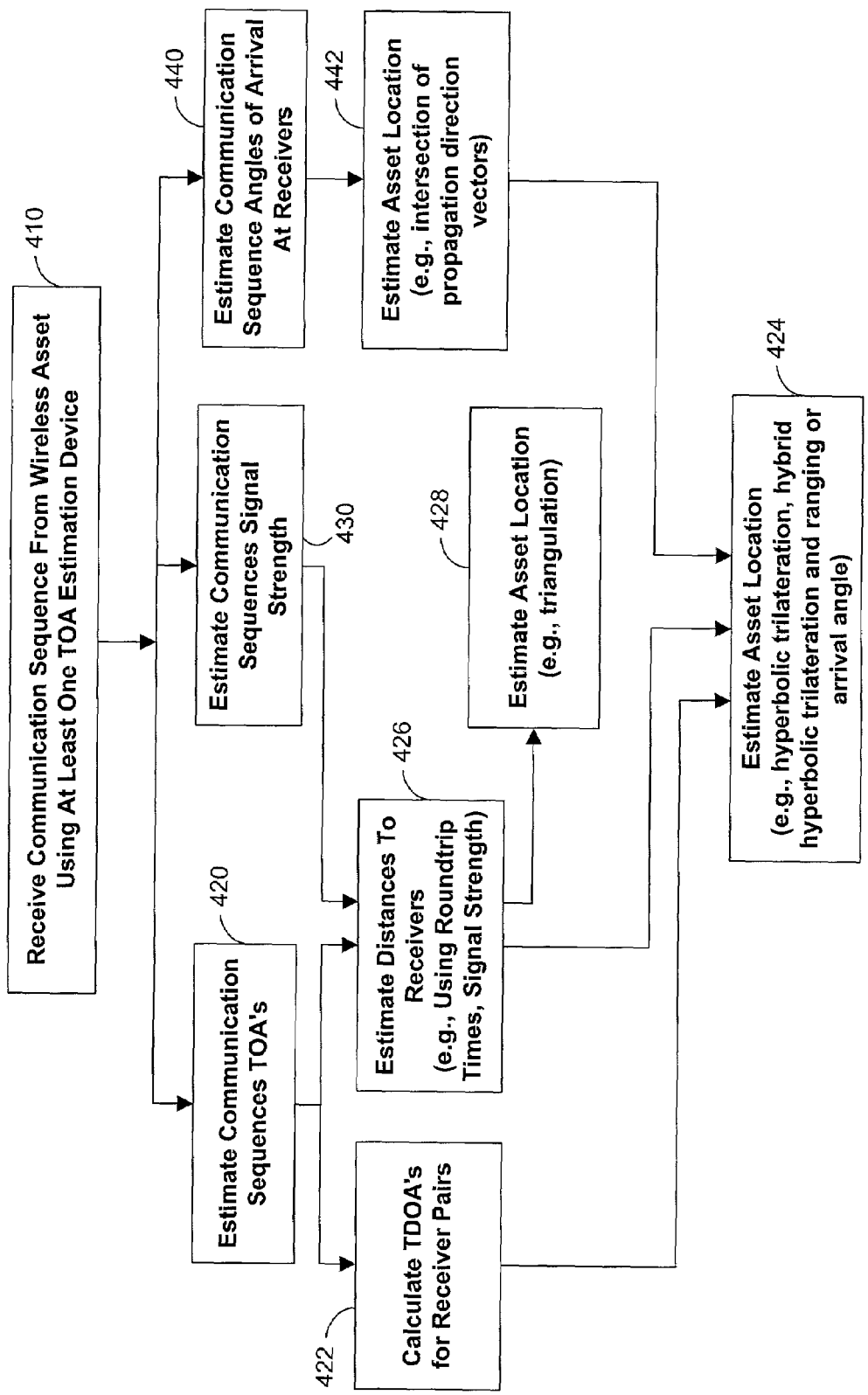
FIG. 4 is a flow chart showing illustrative steps that may be performed during wireless asset location identification in accordance with the principles of the invention.

FIG. 4 shows a generalized flowchart of illustrative steps that may be involved in some embodiments of the present invention related to identifying a location of a wireless asset in a communication network. The steps shown in FIG. 4 are only illustrative and may be performed in any suitable order. In practice, there may be additional steps or some of the steps may be deleted. Some of the steps shown in FIG. 4 may involve receiving wireless signals. Some of the steps shown in FIG. 4 may involve transmitting wireless signals. Some of the steps shown in FIG. 4 may involve processing signals. These and other steps may be performed using any suitable apparatus, including some or all of the elements of system 100 shown in FIG. 1, system 200 shown in FIG. 2, and system 310 shown in FIG. 3.

In step 410, a TOA estimation device or a group of TOA estimation devices may receive at least one communication sequence from a wireless asset. In some embodiments, communication sequences may be received by TOA estimation devices operating at different frequencies. In step 420, one or more communication sequence may be time-stamped. In some embodiments, the time-stamping may be performed locally at the TOA estimation device. In step 422, a central processor may collect TOA estimates from network TOA estimation devices and calculate TDOA's for pairs of TOA's. In step 424, TDOA's may be used to generate wireless asset TDOA solution sets for identifying a wireless asset location (for example, using hyperbolic trilateration).

In step 426, a TOA may be used in conjunction with a time of broadcast (hereinafter, "TOB") of a ranging signal to estimate the distance between a TOA estimation device and a wireless asset. For example, a TOB, a TOA, and any delays involved in signal processing may be used to calculate a round trip signal propagation time. Using the propagation speed of the signal, the distance may be estimated.

In some embodiments, signal strength of a received communication sequence may be estimated in step 430. In some of these embodiments, signal strength may be estimated locally at a TOA estimation device. In some embodiments, a signal strength at a receiver may be used in conjunction with a signal strength at a wireless asset transmitter to calculate signal attenuation. In step 426, signal strength or attenuation may be used to estimate a distance between the wireless asset and a TOA estimation device. In step 428, estimates of distances from different receivers of known position may be used to identify a wireless asset location, for example, using triangulation.

In step 440, communication sequence carrier signal phase may be used to estimate an angle of arrival (hereinafter, "AOA") of a communication sequence at a TOA estimation device. When more than one AOA is known for a communication sequence or a series of communication sequences from a wireless asset, a wireless asset location may be identified using the intersection of two or more carrier signal propagation direction vectors.

In some embodiments, wireless asset location may be identified using hybrid methods combining a TDOA solution set, a distance between wireless asset and TOA estimation device, a carrier signal propagation direction, or any combination or sub-combination thereof.

Figure 5:
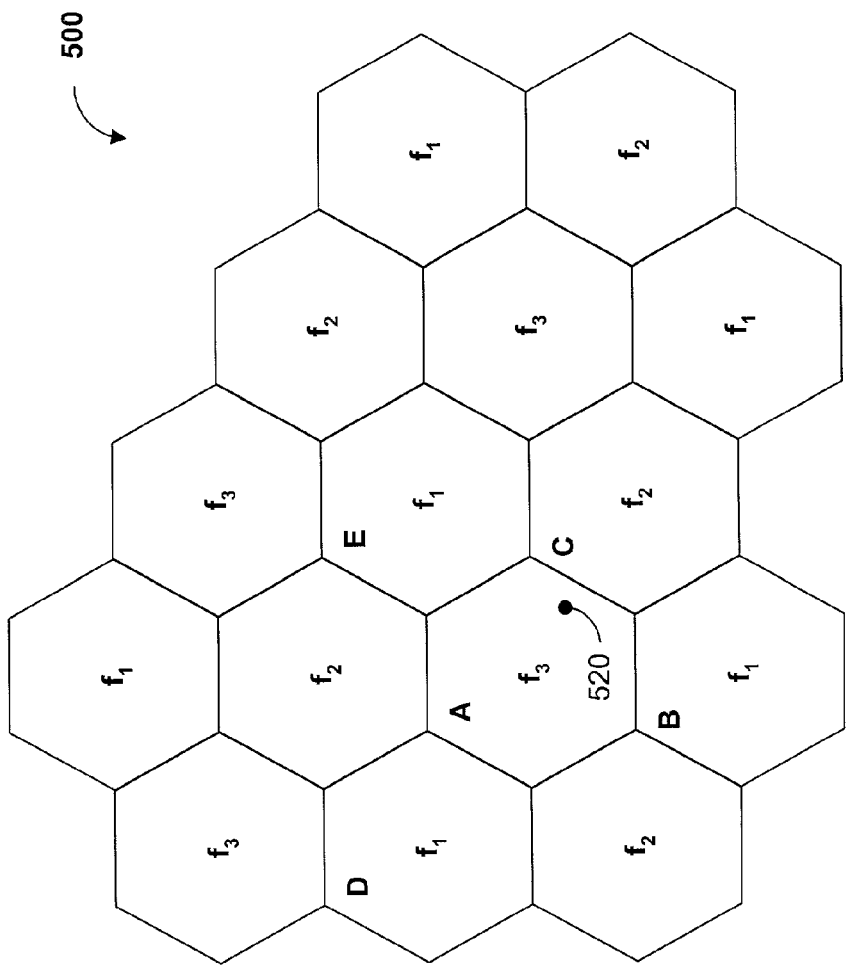
FIG. 5 is a schematic diagram of an illustrative communication network architecture in accordance with the principles of the invention.

FIG. 5 shows the architecture of illustrative cellular wireless communication network 500 that may be used to identify a location of a wireless asset using frequency multiplexing. Network 500 may include some or all of the elements of network 310 shown in FIG. 3. Network 500 has numerous cells operating at selected frequencies. The frequencies shown in the cells of network 500 are primary operating frequencies (e.g., "assigned" frequencies). In some embodiments, TOA estimation devices may operate on at least one frequency that is different from the primary frequency. Each cell may have one or more receiver devices or access points. In some embodiments, each cell may have one or more TOA estimation device such as 100. Network 500 has three primary operating frequencies, $f_1$, $f_2$, and $f_3$, but the invention may include networks that have a greater or lesser number of primary operating frequencies. Wireless asset 520, positioned within an $f_3$ cell, is within range of nearby receiver devices operating at frequencies $f_1$, $f_2$, and $f_3$. If one of the three operating frequencies is "busy" with other communication traffic, wireless asset 520 may attempt to communicate using at least one of the other two frequencies.

In some embodiments, TOA estimation devices in each cell may be configured to transmit and receive primarily on the operating frequency assigned to the cell. If wireless asset 520 broadcasts a communication sequence on $f_1$, for example, TOA estimation devices located in cells D, E, and B may receive and time-stamp the communication sequence. In some embodiments of the invention, wireless asset 520 may broadcast the communication sequence on at least one additional frequency to permit time-stamping at other (e.g., more proximal) TOA estimation devices. For example, wireless asset 520 may broadcast the communication sequence first on frequency $f_1$, second on frequency $f_2$, and third on frequency $f_3$, thereby allowing devices in nearby cells A, B, C to time-stamp the communication sequence. In some embodiments, wireless asset 520 may broadcast the communication sequence on multiple frequencies simultaneously using parallel transmitters. In some embodiments, wireless asset 520 may broadcast the communication sequence successively on multiple frequencies.

In some embodiments, the TOA estimation devices in a cell may be configured to switch from a primary frequency to a secondary frequency, a tertiary frequency, or a different frequency. TOA estimation devices in a cell may switch from one frequency to another to receive and time-stamp communication sequences from a wireless asset configured to broadcast, for example, on a single frequency (which may be referred to herein as a "target" frequency). In some embodiments, some or all of the TOA estimation devices in a network may be configured to switch substantially simultaneously to a target frequency to receive a communication sequence for time-stamping.

FIGS. 6–9 show generalized flowcharts of illustrative steps that may be involved in identifying a location of a wireless asset in a communication network using frequency multiplexing. The steps shown in FIGS. 6–9 are only illustrative and may be performed in any suitable order. In practice, there may be additional steps or some of the steps may be deleted. Some of the steps shown in FIG. 6 may involve generating and/or transmitting wireless signals using a wireless asset and may be performed by any suitable apparatus. For example, some or all of the steps shown in FIG. 6 may be performed using a wireless asset such as wireless asset 130 shown in FIG. 1. Some of the steps shown in FIGS. 7–9 involving receiving wireless signals or processing signals may be performed using any suitable apparatus, including some or all of the elements of system 100 shown in FIG. 1, system 200 shown in FIG. 2, network 310 shown in FIG. 3, and network 500 shown in FIG. 5.

Figure 6:
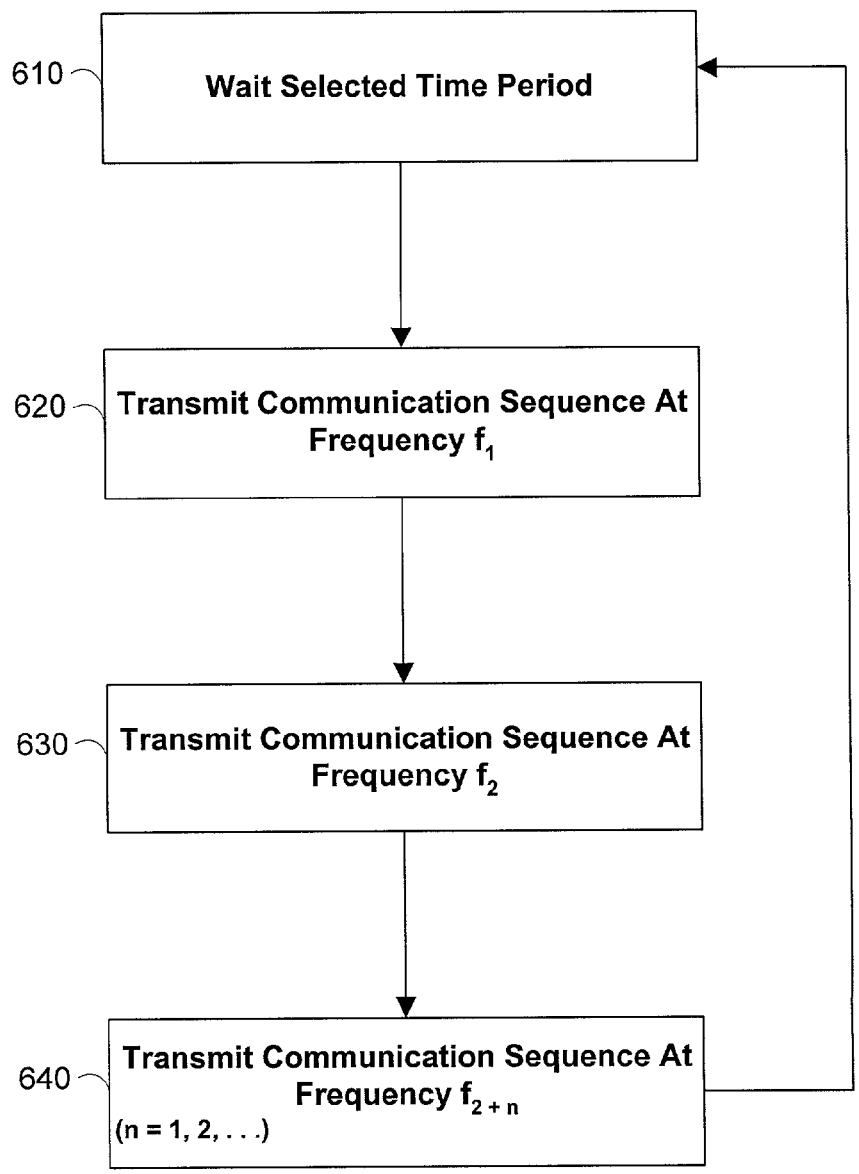
FIG. 6 is a another flow chart showing illustrative steps that may be performed during wireless asset location identification in accordance with the principles of the invention.

In step 610 shown in FIG. 6, the wireless asset may wait a selected period of time before broadcasting a signal that may be used for time-stamping by receiver devices in a communication network. The network may be similar to network 310 shown in FIG. 3 or network 500 shown in FIG. 5. In embodiments involving a multifrequency cellular network such as network 500, the wireless asset may broadcast a communication sequence on frequency $f_1$ (in step 620) at the end of the selected time period. In step 630, the wireless asset transmitter may switch to frequency $f_2$ and broadcast a communication sequence. In step 640, the wireless asset transmitter may switch to frequency $f_3$ and broadcast a communication sequence.

In some embodiments, the wireless asset transmitter may switch to additional frequencies, as denoted by $f_{2+n}$ in step 640, corresponding to operating frequencies available in the communication network. In some embodiments, the communication sequences broadcast on the different frequencies may be substantially identical. In some embodiments, the communication sequences broadcast on the different frequencies may be different.

Figure 7:
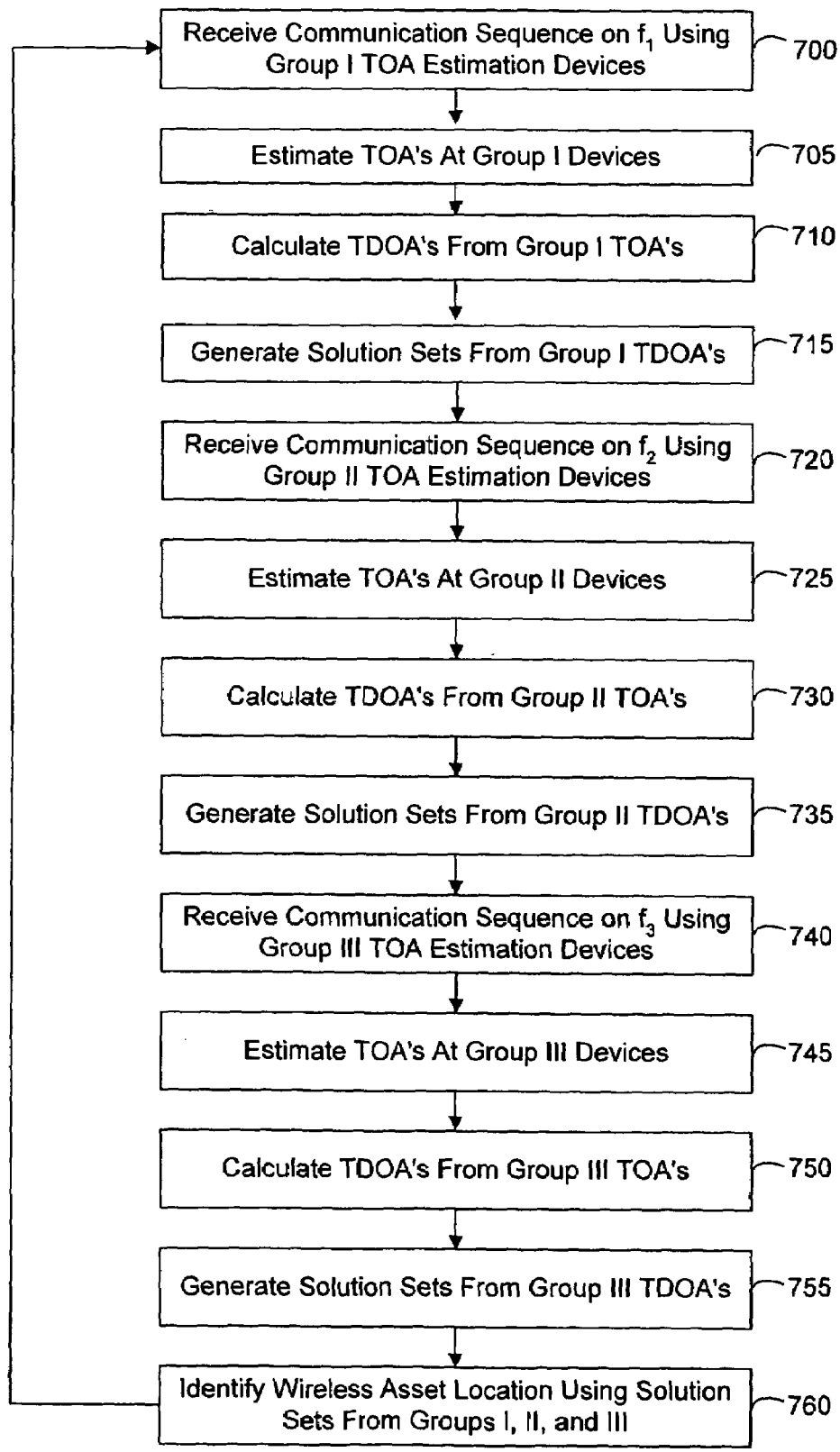
FIG. 7 is yet another flow chart showing illustrative steps that may be performed during wireless asset location identification in accordance with the principles of the invention.

FIG. 7 shows illustrative steps that may be used in a frequency multiplexing scheme in which groups of TOA estimation devices, each operating at a frequency assigned to the group, may be used to identify a location of a wireless asset in a communication network. For the sake of illustration, the network may be divided into three groups of TOA estimation devices (Group I, Group II, and Group III). In some embodiments, the network may be divided into a smaller number of groups. In some embodiments, the network may be divided into a larger number of groups. In step 700, the network may receive using Group I devices a communication sequence broadcast on frequency $f_1$ by the wireless asset. In step 705, Group I devices may time stamp the communication sequence. In step 710, a network processor may calculate TDOA's from pairs of TOA's estimated in Group I. In step 715, a solution set including one or more possible wireless asset locations for each TDOA derived from Group I TOA's may be generated.

In step 720, the network may receive using Group II devices a communication sequence broadcast on frequency $f_2$ by the wireless asset. Processes in steps 725–735, involving Group II devices and a communication sequence received on frequency $f_2$, may be analogous to the processes in steps 705–715, involving Group I devices and a communication sequence received on frequency $f_1$. In step 740, the network may receive using Group III devices a communication sequence broadcast on frequency $f_3$ by the wireless asset. Processes in steps 745–755, involving Group III devices and a communication sequence received on frequency $f_3$, may be analogous to the processes in steps 705–715, involving Group I devices and a communication sequence received on frequency $f_1$. In step 760, a network processor may identify the location of the wireless asset using one or more of the solution sets generated in steps 715, 735, 755. If only one solution step is generated in steps 715, 735, and 755, collectively, more information may be required to identify the wireless asset location. Step 760 may be followed by a return to step 700 to begin a new multi-frequency time-stamping cycle.

Figure 8:
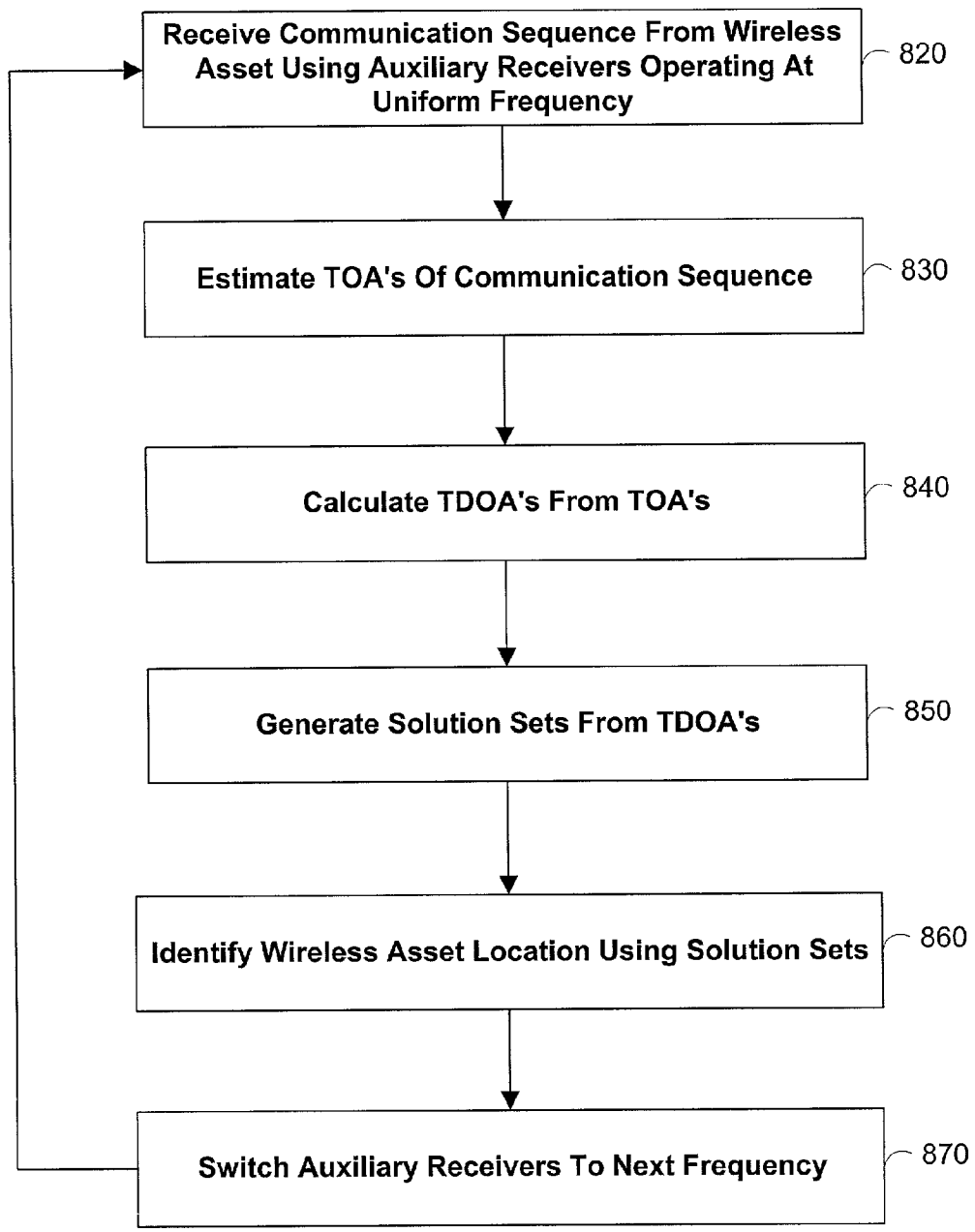
FIG. 8 is yet another flow chart showing illustrative steps that may be performed during wireless asset location identification in accordance with the principles of the invention.

FIG. 8 shows illustrative steps that may be used in a frequency multiplexing scheme in which TOA estimation devices including one or more auxiliary receivers may be used to identify a location of a wireless asset in a communication network. An auxiliary receiver may be present in a TOA estimation device (e.g., in addition to a primary receiver operating at a primary frequency) to provide signal reception on a frequency other than a primary operating frequency without interrupting reception on the primary frequency. In step 820, auxiliary receivers operating at a uniform frequency may receive a communication sequence from a wireless asset. In step 830, the TOA of the communication sequence at each receiver may be estimated (e.g., using a TOA estimation device associated with each receiver). In step 840, TDOA's may be calculated from pairs of TOA's estimated at the receivers. In step 850, a solution set including one or more possible wireless asset locations for each TDOA derived in step 840 may be generated. In step 860, the wireless asset location may be identified using one or more of the solution sets generated in step 850. If only one solution set is generated in step 850, additional information may be required to identify the wireless asset location. In step 870, the auxiliary receivers may be switched to a new uniform frequency to repeat the wireless asset location cycle using a communication sequence which may be received on the new frequency. In some embodiments of the invention, auxiliary receivers may not be present. In these embodiments, primary receivers may be configured to be switched to different frequencies to perform steps 820–870.

Figure 9:
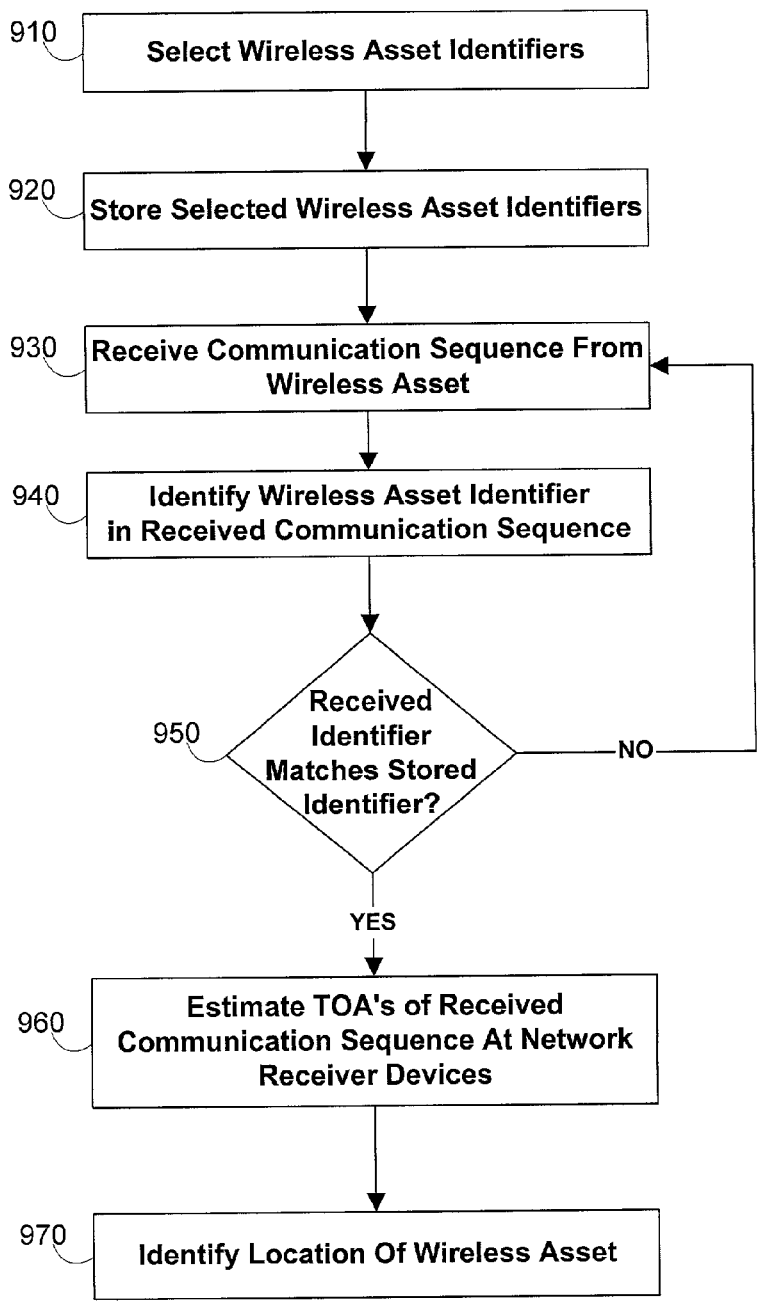
FIG. 9 is yet another flow chart showing illustrative steps that may be performed during wireless asset location identification in accordance with the principles of the invention.

FIG. 9 shows illustrative steps that may be performed by a network for carrying out "selective listening" for wireless assets. In some embodiments, a communication sequence received from a wireless asset that is a member of a preselected set of wireless assets may be time-stamped. In step 910, one or more wireless asset identifiers corresponding to wireless assets for which location identification is desired may be selected. In step 920, selected identifiers may be stored. In step 930, a communication sequence from a wireless asset may be received by the network. In step 940, an asset identifier may be parsed from the communication sequence to determine the identity of the transmitting wireless asset. In step 950, the received identifier may be compared to preselected identifiers. If the received identifier does not match a preselected identifier, no TOA or location identification processing may occur. The process may revert to step 930 and the network may receive a new communication sequence for possible location identification. If the received identifier matches a preselected identifier, the communication sequence TOA may be estimated in step 960. Steps 930–960 may be performed at multiple receiver devices in the network so that multiple TOA's respectively corresponding to the multiple receiver devices may be estimated in step 960. In step 970, the TOA estimates from step 960 may be used to identify the wireless asset location. In some embodiments, steps 960 and 970 may involve estimating and/or processing non-TOA quantities that may be used for location identification. For example, steps 960 and 970 may include one or more of steps 424, 426, 428, 430, 440, and 442 shown in FIG. 4.

Figure 10:
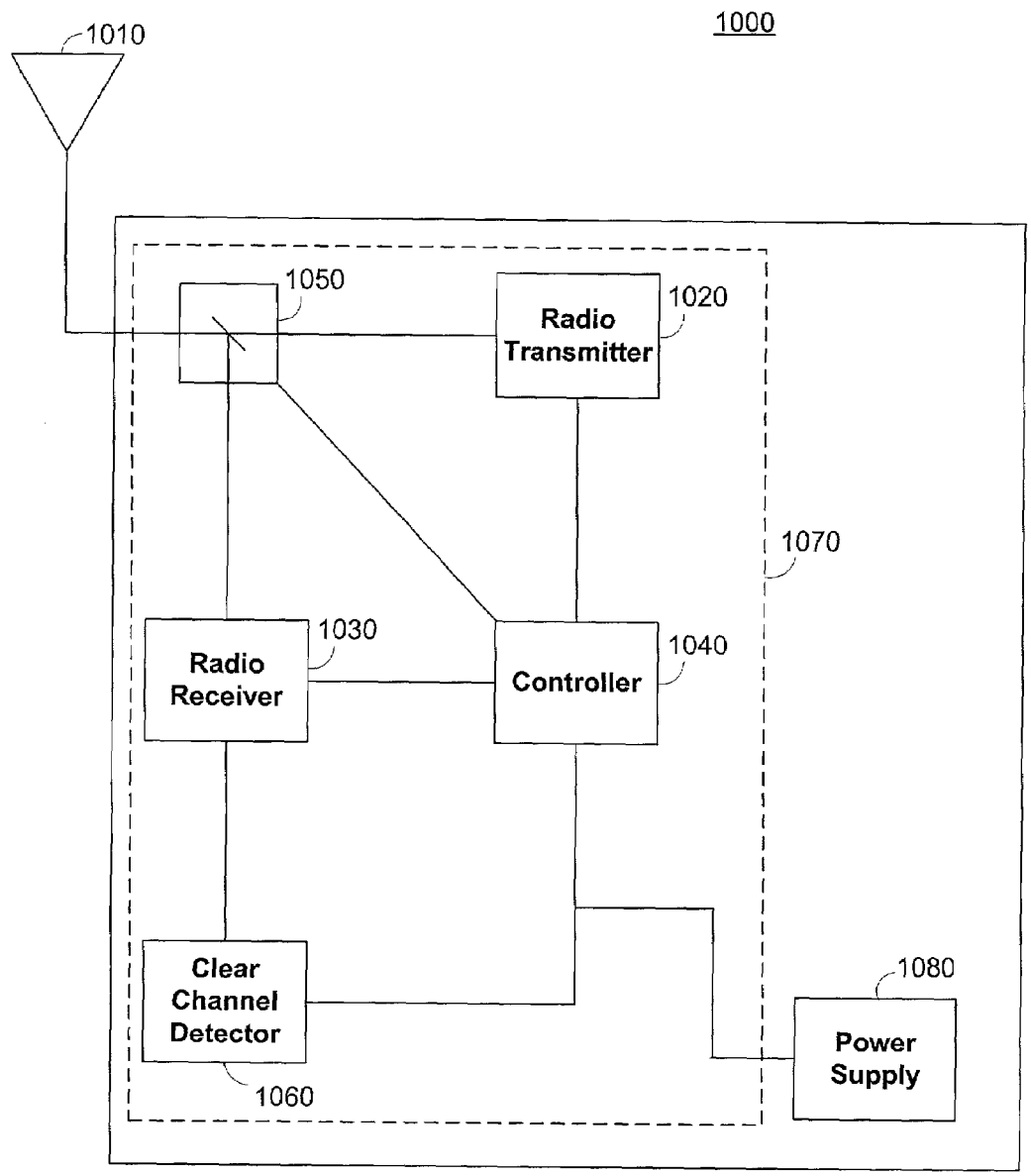
FIG. 10 is a schematic diagram showing another illustrative apparatus that may be used in conjunction with a wireless asset location identification system in accordance with the principles of this invention.

FIG. 10 shows an illustrative architecture for wireless tag 1000 that may be attached to a mobile article for location identification purposes. Antenna 1010 may transmit signals to and receive signals from apparatus (such as system 100 shown in FIG. 1 and system 200 shown in FIG. 2) of a communication network. Radio transmitter 1020 may be present to generate communication sequences for broadcast to the network. Transmitter 1020 may be configured to modulate communication sequences using carrier signals of different frequencies. In some embodiments, communication sequences that are favorable for wireless asset location identification may be selected. Wireless asset identification information may be included in some communication sequences. Controller 1040 may be present in tag 1000 and may interact with radio receiver 1030 and clear channel detector 1060 to detect the presence of radio frequency traffic on a communication channel. In some embodiments, radio receiver 1030 may not be present. In these embodiments, clear channel detector 1060 may be used to determine if a channel is clear. Clear channel detector 1060 may be an energy detector. Tag 1000 may "listen" to traffic on a channel using receiver 1030 and detector 1060. If the channel is clear, tag 1000 may broadcast a communication sequence on the channel. If traffic is present on the channel, controller 1040 may switch receiver 1030 to successive different listening frequencies until a clear channel is detected. Controller 1040 may then switch transmitter 1020 to the clear channel to broadcast the communication sequence. Transmit/receive switch 1050, which may be controlled by controller 1040, may be present for switching antenna 1010 into communication with either transmitter 1020 or receiver 1030.

In some embodiments, receiver 1030 may be configured to receive a signal from the network that includes an instruction to broadcast a communication sequence to enable the network to identify the location of the tag. Tag 1000 may be powered by power supply 1080. In some embodiments, component group 1070 may be configured to operate at low power to reduce the load on power supply 1080.

Figure 11:
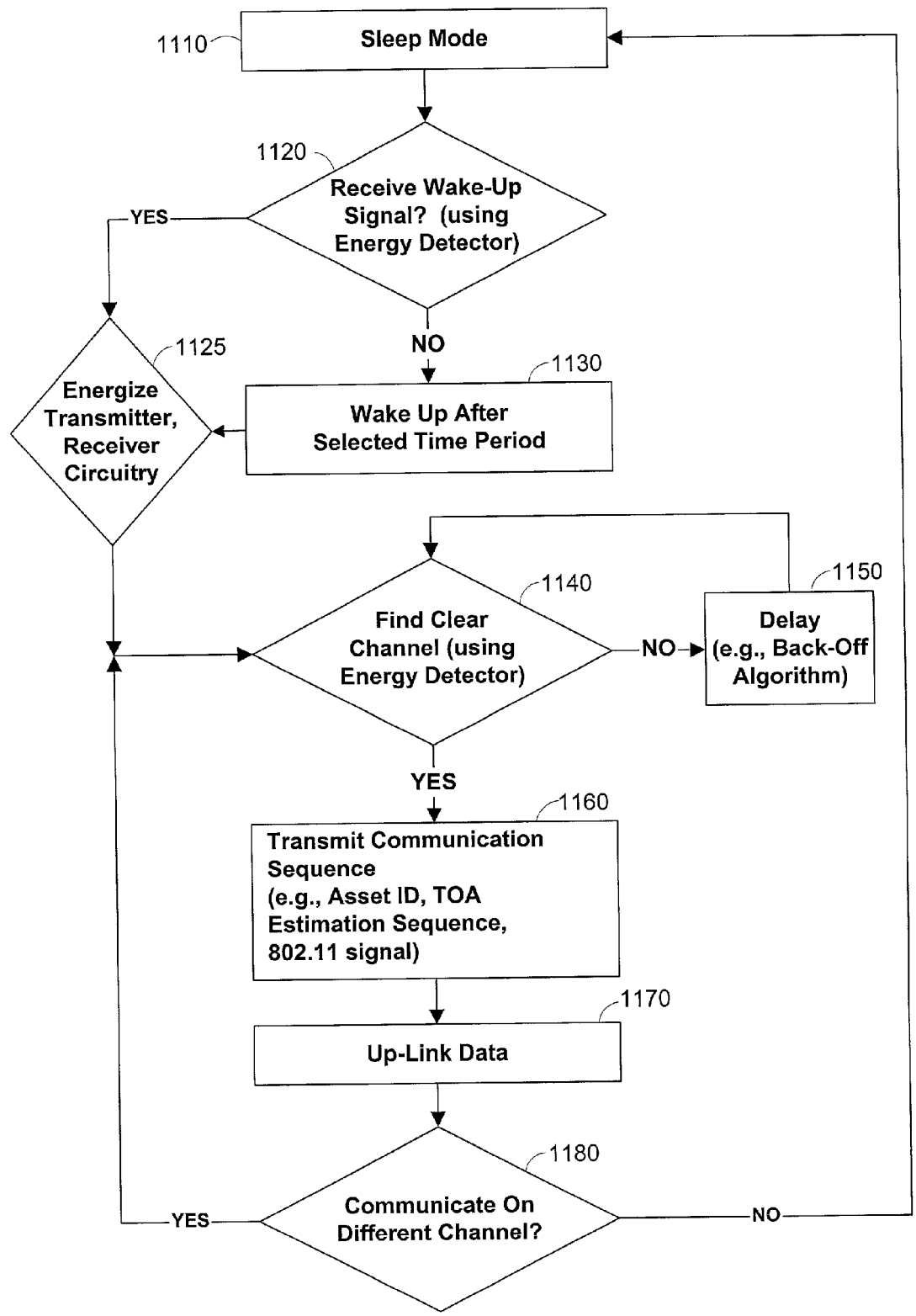
FIG. 11 is yet another flow chart showing illustrative steps that may be performed during wireless asset location identification in accordance with the principles of the invention.

FIG. 11 is a generalized flowchart of illustrative steps that may be involved in providing location identification information concerning a mobile article to a communication network. The steps shown in FIG. 11 are only illustrative and may be performed in any suitable order. In practice, there may be additional steps or some of the steps may be deleted. Some of the steps shown in FIG. 11 may involve generating and/or transmitting wireless signals using a tag and may be performed by any suitable apparatus. For example, some or all of the steps shown in FIG. 11 may be performed using a wireless asset such as wireless asset 130 shown in FIG. 1 (including tag 1000 shown in FIG. 10), or any suitable apparatus. For the sake of simplicity, it will be assumed that the steps shown in FIG. 11 are performed by tag such as 1000.

In step 1110, a tag may be maintained in a sleep mode. In some embodiments of the invention, the sleep mode may conserve power, for example, in power supply 1080 shown in FIG. 10. A transmitter, which may be a network transmitter, may transmit a wake-up signal to the tag. A wake-up signal may be a strong RF signal transmitted near the tag. In step 1120, the tag may receive the wake-up signal using an energy detector. If no wake-up signal is received by the end of a predetermined time period, the tag may be configured to wake-up automatically in step 1130. Transmitter and receiver circuitry (such as that in component group 1070 shown in FIG. 10) may be energized in step 1125. If a wake-up signal is received, transmitter and receiver circuitry may be energized in step 1125. After energizing transmitter and receiver circuitry, the tag may determine if a communication channel is clear for broadcasting a communication sequence in step 1140. In some embodiments, step 1140 may be performed using an energy detector. Some of the steps shown in FIG. 11 may be performed by a tag (e.g., a tag similar to tag 1000 shown in FIG. 10) that is configured to broadcast 802.11 signals, but is not fully 802.11 compliant. For example, the tag may not include a receiver. If the channel is not clear for broadcast, the tag may activate a delay in step 1150. Step 1150 may include the use of a back-off algorithm to provide a preselected delay before returning to step 1140 to check the channel again. The back-off algorithm may be an 802.11 compliant back-off algorithm. In some embodiments, step 1150 may be followed by a return to step 1110 to return the tag to sleep mode. In some embodiments, step 1140 may include detecting traffic on successive different frequencies.

When a clear channel is detected in step 1140, the tag may broadcast a communication sequence in step 1160. The communication sequence may be broadcast on the clear channel detected in step 1140. The communication sequence broadcast in step 1160 may include information that identifies the tag or the article to which it is attached. Any suitable identification information may be included in the communication sequence, for example, if the step is performed by a different type of wireless asset. The communication sequence may include location identification information. The communication sequence may include symbols compatible with IEEE 802.11 communication standard.

In step 1170, the tag may uplink data to the network. The tag may uplink data to the network using 802.11 communication protocols. Uplinked data may include battery status information, tag temperature information, or any other suitable information. In some embodiments, the tag may broadcast a communication sequence on a different channel in step 1180. If so, the process may revert to step 1140 and a new clear channel may be sought. If not, the process may revert back to 1110 to return the tag to sleep mode.

FIGS. 12–20 illustrate some of the principles, methods, and apparatus that may be involved in embodiments of the invention that may provide communication sequence timestamping.

A correlation function may be used to detect patterns in the symbols present in a communication sequence. A local or global extreme value in a correlation function may correspond to a symbol pattern having strong autocorrelation properties. A symbol pattern having strong autocorrelation properties may generate an easily observed and reproducible correlation function peak. The time value of such a peak be used as a TOA estimate, or a time stamp, for the received data signal. In some embodiments, a correlation function $C(\tau)$ may be defined by:

$$C(\tau) = \int_{-T}^{T} D(t) R(t-\tau) dt \quad (1)$$

wherein t is a measure of time, D(t) represents a demodulated received signal which may be time-dependent, and R(t) represents a reference signal. R(t) may correspond to a pattern of symbols present in D(t). −T and T, respectively, may be the beginning and end of a time interval during which $C(\tau)$ is evaluated (or scanned for an extreme value). The TOA estimate for $D(t)$ may be defined as the value of $\tau$ that causes $C(\tau)$ to have an extreme value. The extreme may be a maximum. The extreme may be a minimum. The value of $\tau$ that corresponds to an extreme value in $C(\tau)$ may be referred to as $\hat{\tau}$.

Figure 12:
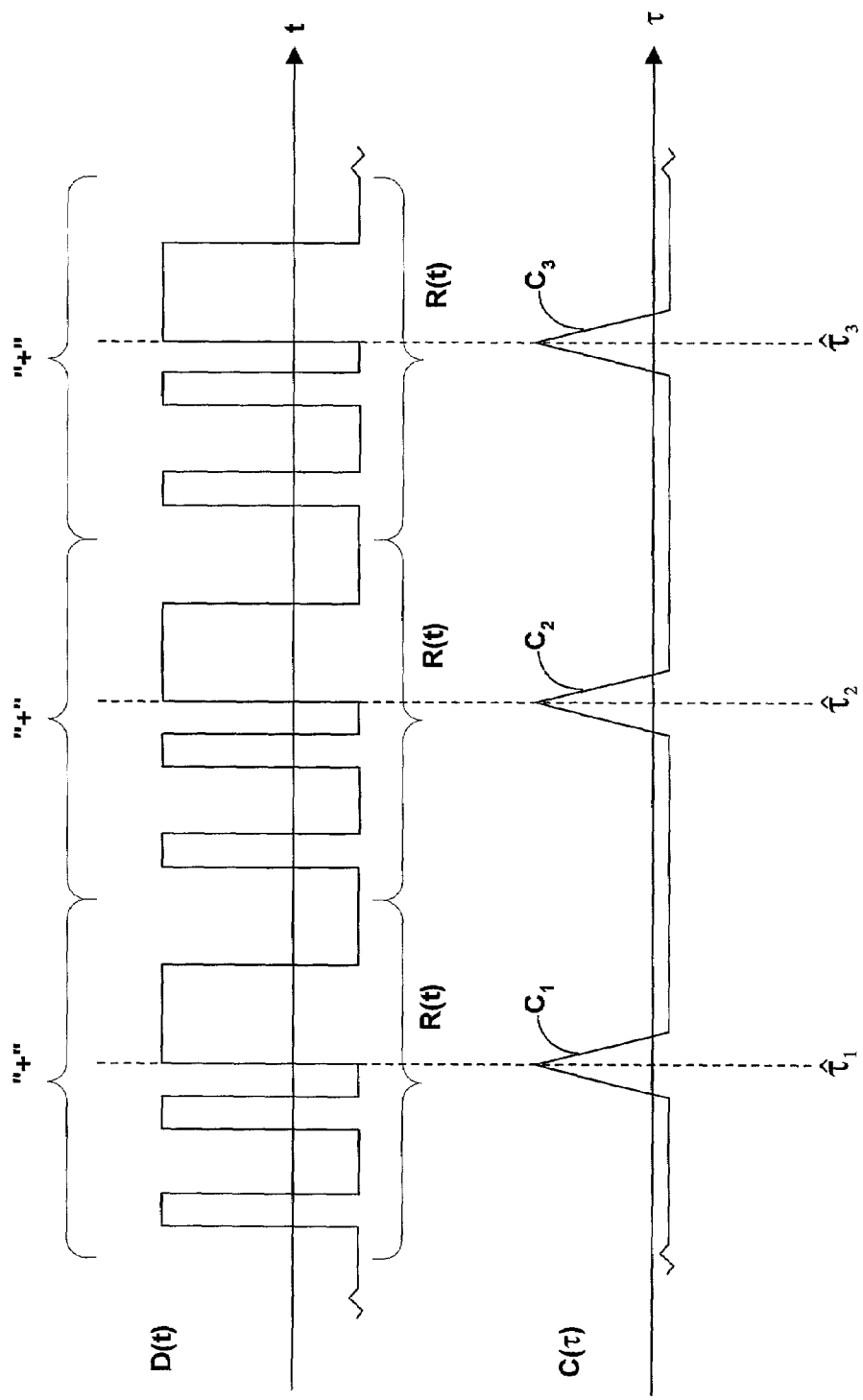
FIG. 12 shows illustrative received data and, in accordance with the principles of this invention, a corresponding illustrative correlation signal.

FIG. 12 shows an example of $C(\tau)$ for illustrative examples of $D(t)$ and $R(t)$. In this example, $D(t)$ is a communication sequence that includes a concatenation of three consecutive identical information symbols. Each symbol, indicated by a "+", is illustrated as a PN code. For example, the PN code may be a Barker code. Although the symbols are illustrated as PN codes, principles discussed herein may be applied to PBCC, CCK, OFDM, or other suitable symbols. $R(t)$ may be chosen to correspond to an information symbol or pattern of information symbols that may be present in $D(t)$. In the example shown in FIG. 12, $R(t)$ is the same as the single repeating information symbol ("+"). For each occurrence of $R(t)$ in $D(t)$, $C(\tau)$ has a peak value. Any of estimators $\hat{\tau}_1$, $\hat{\tau}_2$, and $\hat{\tau}_3$, corresponding to local $C(\tau)$ peaks $C_1$, $C_2$, and $C_3$, respectively, may be selected as a TOA estimate. In some embodiments, the TOA of $D(t)$ may be defined to be the average of estimators such as $\hat{\tau}_1$, $\hat{\tau}_2$, and $\hat{\tau}_3$. For example, the TOA of $D(t)$ may be defined as:$\tau$ $$\langle \hat{\tau} \rangle \equiv \frac{1}{N} \sum_{i}^{N} \hat{\tau}_i \quad (2)$$

wherein $\hat{\tau}$ is the average of N $\hat{\tau}$ estimates for a given $D(t)$.

Figure 13:
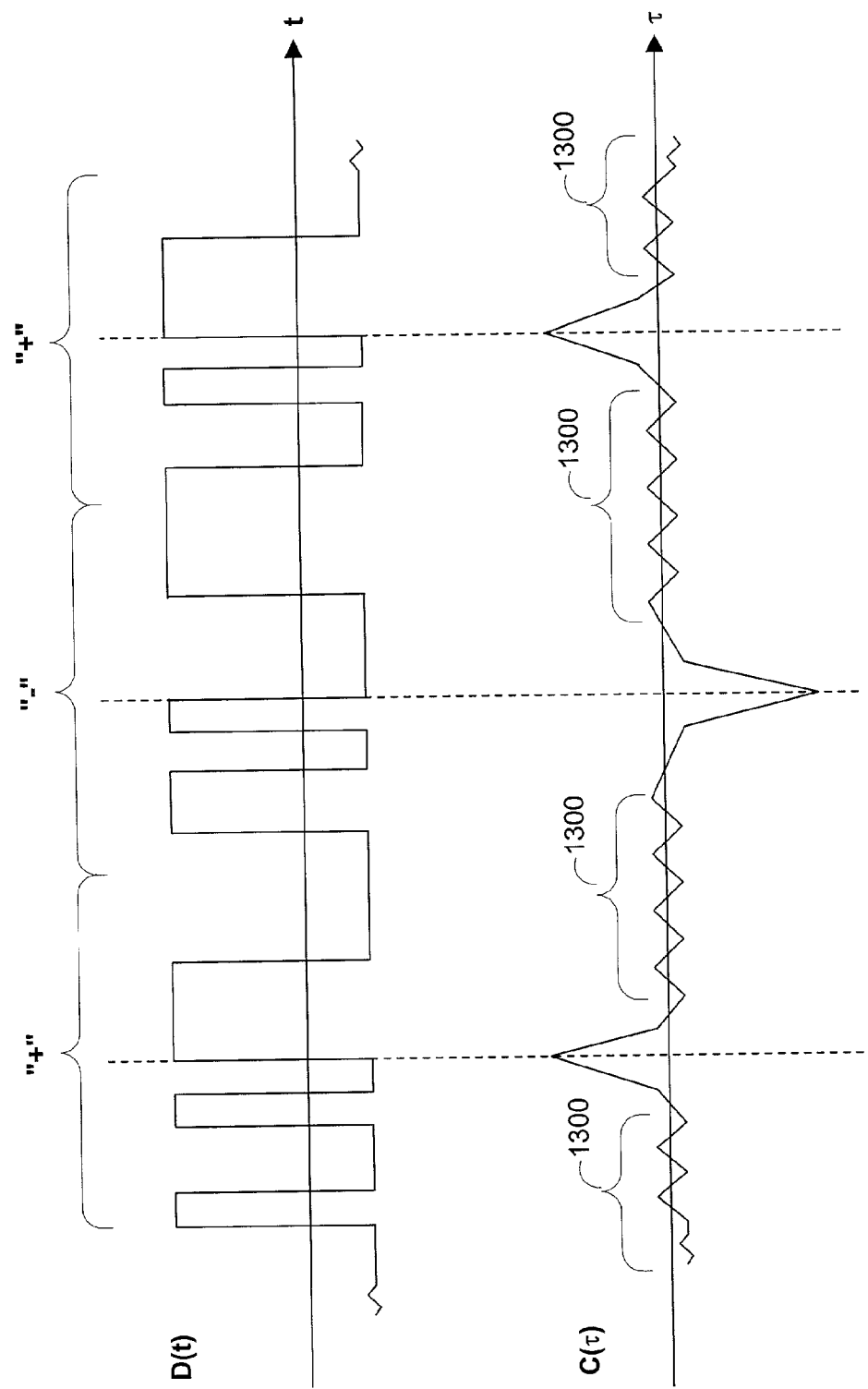
FIG. 13 shows other illustrative received data and a corresponding illustrative correlation signal.

FIG. 13 shows an example of $D(t)$ that is similar to that shown in FIG. 12, but the "polarity" of the second information symbol, identified by a "−" in FIG. 12, is reversed. (Information symbols of opposite "polarity," as used herein, produce correlation signals of opposite sign for a given correlation function.) The corresponding second peak in $C(\tau)$ has a negative value. Because the value of $C(\tau)$ at a given point in time depends on a range of values of t (viz., from −T to T), $C(\tau)$ may be sensitive to changes in polarity of $D(t)$. As a result, cross-correlation noise such as 1300 may be observed in $C(\tau)$. Noise 1300 may make it difficult to separate line of sight signal components from multipath because the noise and line of sight components may be of similar magnitude.

Figure 14:
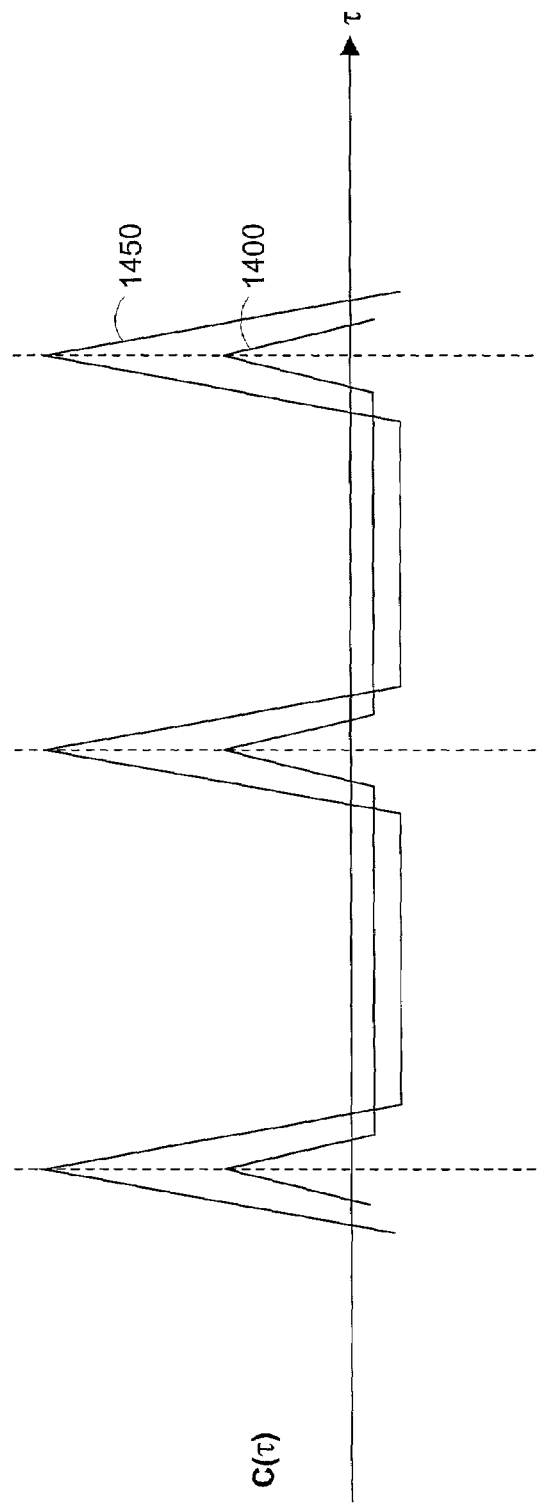
FIG. 14 shows two illustrative correlation signals in accordance with the principles of this invention.

FIG. 14 shows two illustrative examples of $C(\tau)$. Form 1400 is identical to that shown in FIG. 12. Form 1450 has enhanced peak magnitude relative to form 1400. Peak magnitude may be enhanced by using a reference signal equal to a concatenation of information symbols that may be present in $D(t)$. For example, a correlation function $C'(\tau)$ defined as $$C'(\tau) = \int_{-T}^{T} D(t) R'(t-\tau) dt \quad (3)$$

may include signal $R'(t)$. $R'(\tau)$ may include concatenated $D(t)$ information symbols. For example, $R'(t)$ may be the concatenation of the 3 consecutive symbols (each denoted by a "+") shown in FIG. 12.

Figure 15:
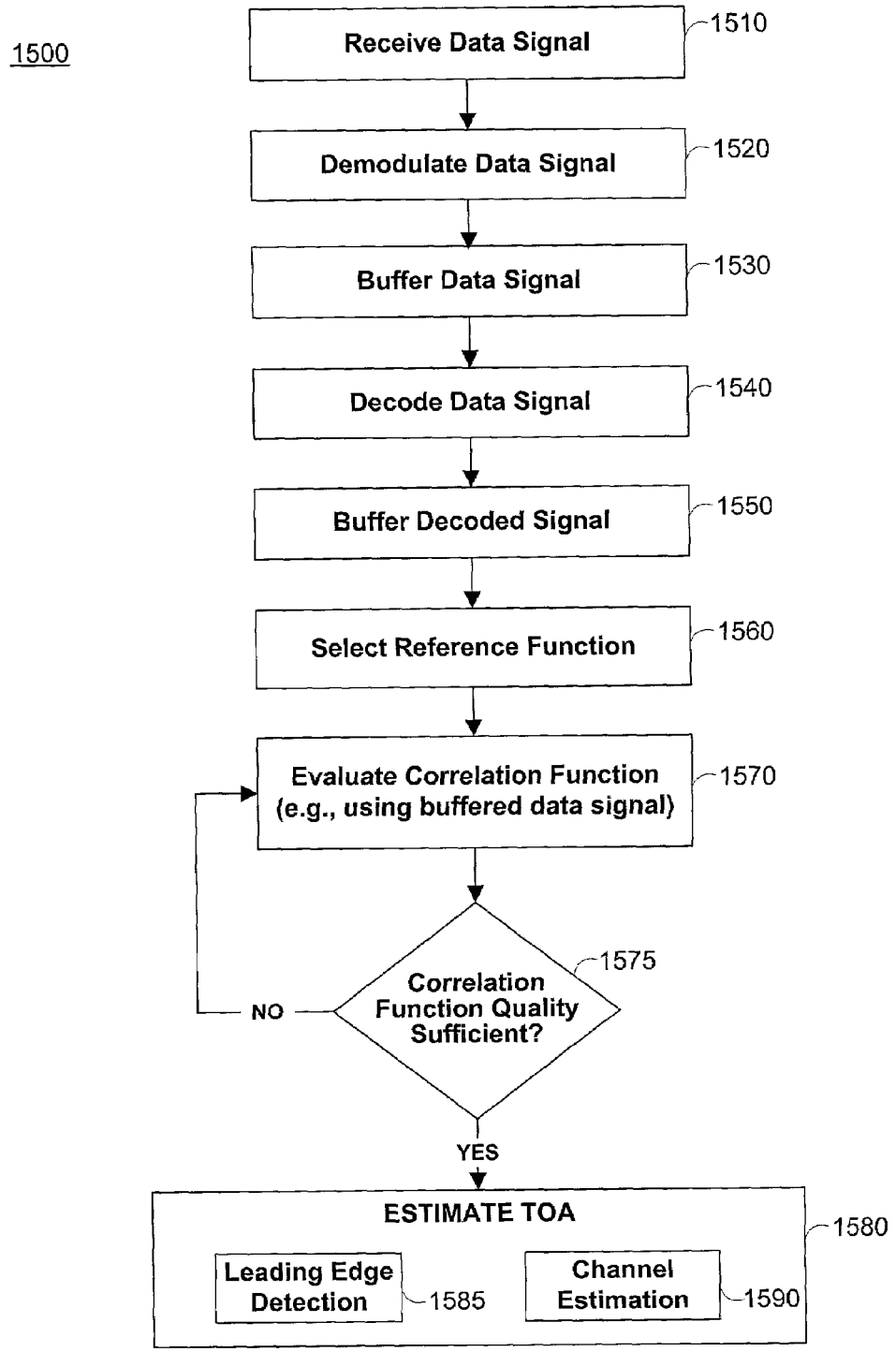
FIG. 15 is yet another flow chart showing illustrative steps that may be performed during wireless asset location identification in accordance with the principles of the invention.

FIG. 15 shows a general flowchart of illustrative steps that may be involved in some embodiments of the present invention. The steps shown in FIG. 15 are only illustrative and may be performed in any suitable order. In practice, there may be additional steps or some of the steps may be deleted. Some of the steps shown in FIG. 15 may involve receiving wireless signals. Some of the steps shown in FIG. 15 may involve processing signals. These and other steps may be performed using any suitable apparatus, including receivers such as receiver 110 shown in FIG. 1 and apparatus such as those included in TOA estimation device 200 shown in FIG. 2.

For clarity, the following discussion will describe the steps shown in FIG. 15 as being performed by "the system," which is intended to include any system suitable for performing the steps. The system may receive a data signal at step 1510. The data signal may be received from a wireless asset such as wireless asset 130 shown in FIG. 1 or wireless asset 350 shown in FIG. 3. The data signal may be demodulated at step 1520 to yield a demodulated signal. The system may buffer the data signal at step 1530. Buffered data may be used when information sequences are detected as described below. The demodulated signal may be decoded, by correlation and digitization, for example, into a sequence of decoded binary data at step 1540. The decoded binary data may be buffered at step 1550.

In some embodiments, the buffered binary data may be analyzed to detect the presence of a favorable pattern of information symbols in step 1560. In step 1570, a correlation function such as $C(\tau)$, including a reference signal such as $R(t)$, may be evaluated. (Although steps utilizing $C(\tau)$ and $R(t)$ are shown and discussed in connection with FIGS. 15–17 for the sake of simplicity, the scope of FIGS. 15–17 and their description herein includes corresponding steps utilizing $C'(\tau)$ and $R'(t)$, when concatenated information symbols are selected as a reference function, instead of $C(\tau)$ and $R(t)$, respectively.)

At step 1575, correlation signal quality checks may be performed (on $C(\tau)$, for example) Correlation signal quality may be quantified using an objective measure such as signal-to-noise ratio, peak magnitude, or any other suitable index.

If a correlation signal $C(\tau)$ is of sufficient quality, line of sight signal components may be separated from multipath in step 1580. Step 1580 may include step 1585 for leading edge detection. Step 1580 may include step 1590 for channel estimation. Channel estimation may include super-resolution techniques such as MUSIC or any other suitable channel estimation technique.

Figure 15A:
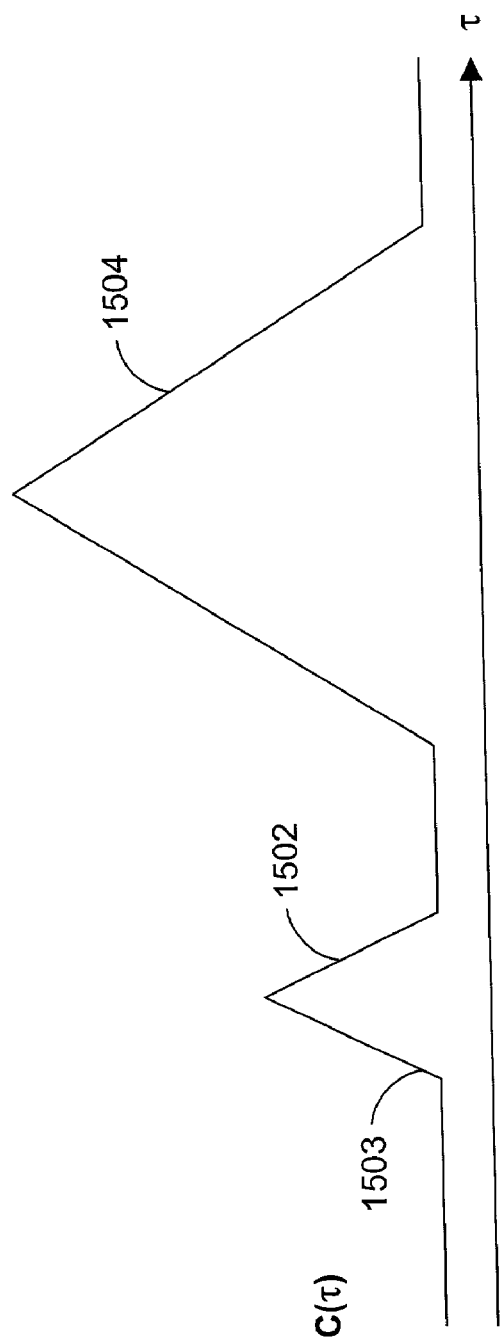
FIG. 15A shows an illustrative correlation signal that may be processed in accordance with the principles of the invention.

At step 1580, the system may estimate TOA. In some embodiments, the system may maximize $C(\tau)$ to determine $\hat{\tau}$. The system may define a TOA as $\hat{\tau}$. In some embodiments in which it is possible for $C(\tau)$ to have negative values, the system may minimize $C(\tau)$ to determine $\hat{\tau}$. In some embodiments the system may define the TOA to be the leading edge of a correlation peak. For example, in step 1590, line of sight peak 1502 shown in FIG. 15A may be separated from multipath peak 1504 (also shown in FIG. 15A). Leading edge 1503 of line of sight peak 1502 may be defined as the TOA of the communication sequence. Peak 1502 may be distinguished from peak 1504 because line of sight pulses are received before multipath pulses. (Multipath signals may have longer propagation paths than line of sigh signals.) In some cases, line of sight peak 1502 may overlap or merge with multipath peak 1504. In these cases, the leading edge of the merged pulse may be defined as the TOA in step 1585.

Figure 16:
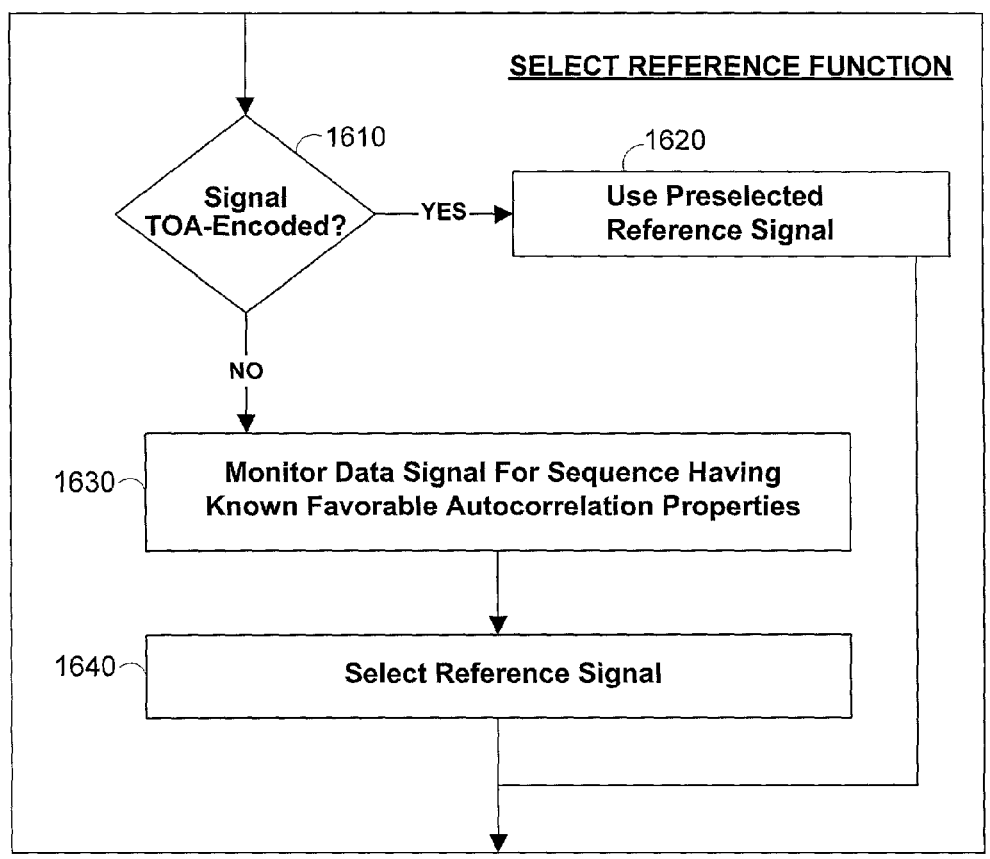
FIG. 16 is a flow chart showing illustrative steps that may be involved in performing a step shown in FIG. 15.

FIG. 16 shows illustrative steps that may be involved in a step such as 1560 of FIG. 15. The steps are only illustrative and may be performed in any suitable order. In practice, there may be additional steps or some of the steps may be deleted. In step 1610, the system may ascertain or determine that a received data signal is TOA-encoded. For example, a wireless asset may transmit a data signal that includes a preselected communication sequence that is favorable for TOA estimation. The preselected communication sequence may be positioned within a data packet at a predetermined location (for example, starting at the nth bit of a data packet). In some embodiments, the system may be configured to detect indicators within a data packet that a TOA estimation communication sequence is located at a given position within the packet. Preselected communication sequences may include PBCC, CCK, and OFDM symbols. Preselected information sequences may include PN codes.

When preselected communication sequences are received by the system, step 1610 may be followed by step 1620, in which the reference signal may be set equal to a sequence of one or more CCK symbols, PBCC symbols, OFDM symbols, or PN codes.

When the system receives a data packet that is not encoded for time-stamping, data signal monitoring may be performed as shown in step 1630. Data signal monitoring may include monitoring a decoded version of the data signal (e.g., from step 1550) for the presence of information symbol patterns favorable for time-stamping. Each bit of decoded data may correspond to one information symbol that may be present in a communication sequence such as D(t) in FIGS. 12 and 13. After detecting a favorable pattern in the bit stream, a reference signal corresponding to the pattern may be selected for correlation with the demodulated signal for time-stamping.

For example, the buffer may store N bits, each bit corresponding to a symbol in D(t), in the order in which the N bits were received and decoded. Thus, if a sequence of bits favorable for time-stamping is detected in the bit stream, the system may target symbols in the buffered data signal that correspond to the bit stream sequence for time-stamping. For clarity, the set of symbols targeted for time-stamping will be referred to herein as "M." When M includes more than one information symbol, the system may correlate on a subset "P" of M. P may be central subset of M. For example, if M has 5 information symbols, the system may be configured to select a reference signal (R(t) or R'(t)) that correlates strongly with P, the three central information symbols of M (viz., the second, third, and fourth symbol of M).

In some embodiments, the system may not perform step 1610. In some of these embodiments, the system may be configured to correlate a reference signal with a pre-determined information symbol or symbols in a communication sequence. For example, the system may be configured to apply a correlation function to the first information symbol in a communication sequence. In another example, the system may be configured to correlate using the 2nd–4th information symbols in a communication sequence. Any suitable symbol or symbols in a communication sequence may be selected for correlation with a reference signal.

Figure 17:
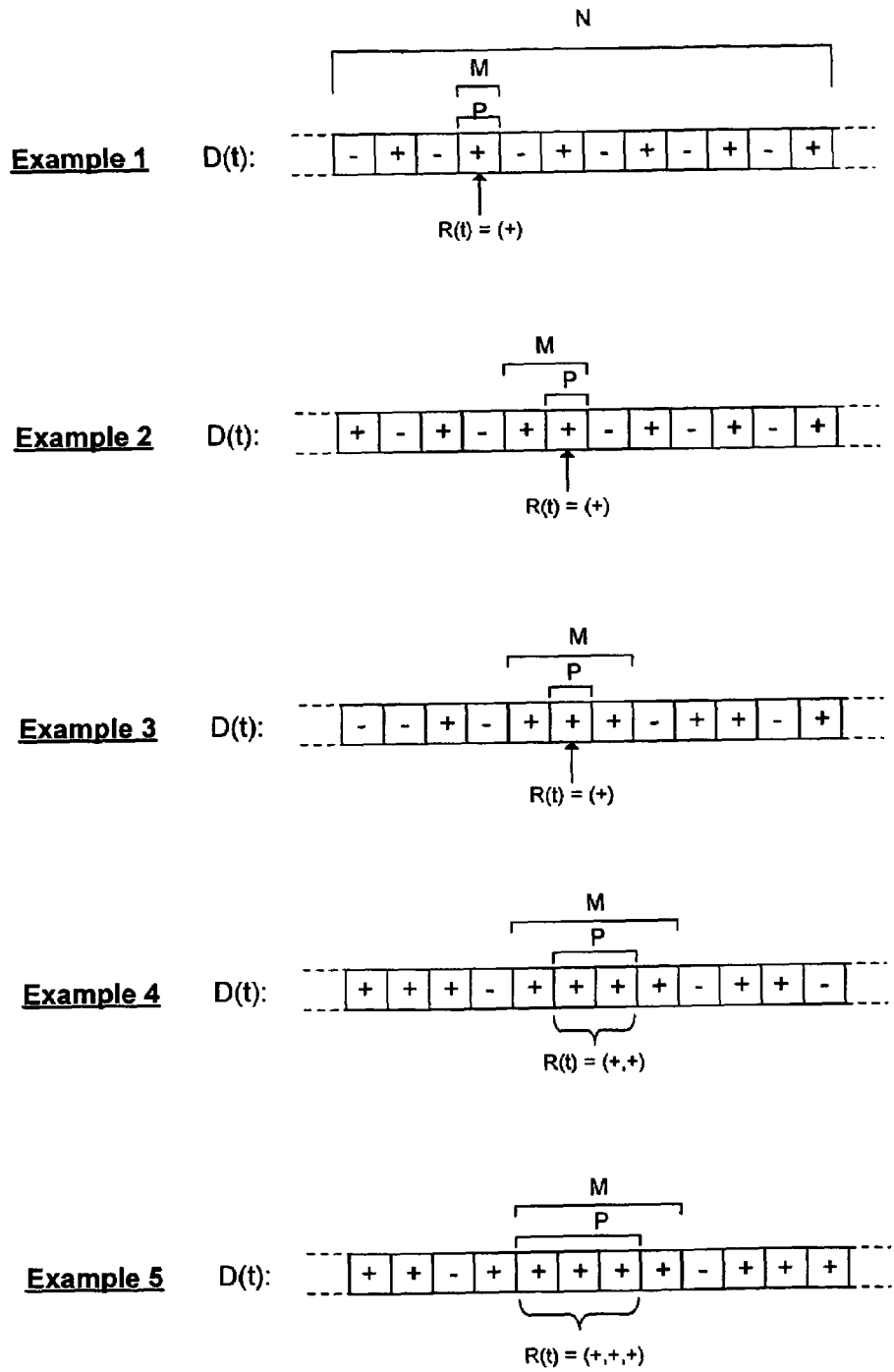
FIG. 17 shows illustrative received data sequences and, in accordance with the principles of the invention, illustrative correlation strategies.

FIG. 17 shows examples of N, D(t), and P that may be involved in step 1630 of FIG. 16, and corresponding examples of R(t) that may be involved in step 1640 of FIG. 16. (For the purpose of this illustration, R(t) refers to single and concatenated reference signals such as those represented in equation 3 as R'(t).)

Each of Examples 1–5 in FIG. 17 includes a buffer having a size N of 12 bits holding a segment of decoded data signal D(t). Each symbol in D(t) is represented by a "+" or a "−", to indicate a positively polarized symbol or a negatively polarized symbol, respectively (following the convention used in FIGS. 12 and 13). M is a set of symbols that may be present in D(t). P is a subset of bits that may be present in M and which may be targeted for correlation with a reference signal R(t). Each symbol in R(t) is represented by a "+" to indicate a positively polarized symbol. Although FIG. 17 shows R(t) having only positively polarized symbols, R(t) may include one or more negatively polarized symbols if necessary. In some embodiments, R(t) may be a sequence of information symbols that is identical to the sequence of information symbols present in P.

In Example 1, only isolated positively polarized symbols are present. The system may select a single symbol reference signal R(t) for correlation with the single symbol of P. In Example 2, M includes 2 symbols. The system may select a single symbol reference signal R(t) for correlation with single target symbol P in M. The system may target the trailing symbol in M to reduce noise (such as cross-correlation noise) in the leading edge of the resulting peak in C(τ) to improve TOA estimation accuracy (in the presence of multipath, for example). In Example 3, M includes three symbols and the system may target central symbol P for correlation with a single symbol R(t). It may be beneficial to target a central subset of symbols in M for correlation with an R(t) having fewer symbols than are present in M. This may reduce noise in C(τ) (or C'(τ)). Examples 4 and 5 illustrate the targeting of central symbols in M. In Example 4, the system targets two symbols (P) that are central to four symbols in M. P may be correlated with an R(t) having 2 symbols. In Example 5, the system targets three symbols (P) that are central to five symbols in M. P may be correlated with an R(t) having three symbols.

In some embodiments, a library of reference signals R(t) may be stored in a look-up table. The look-up table may be indexed by a range of possible detected sequences. A detected sequence may thus be used to select a reference signal that may produce an optimal correlation signal. Some embodiments may provide rules for prioritizing possible choices of R(t) for a given detected sequence in a received data signal. The selection of an appropriate R(t) may produce a correlation signal having pulses that have little or no cross-correlation noise such as those shown in FIG. 14.

Figure 18:
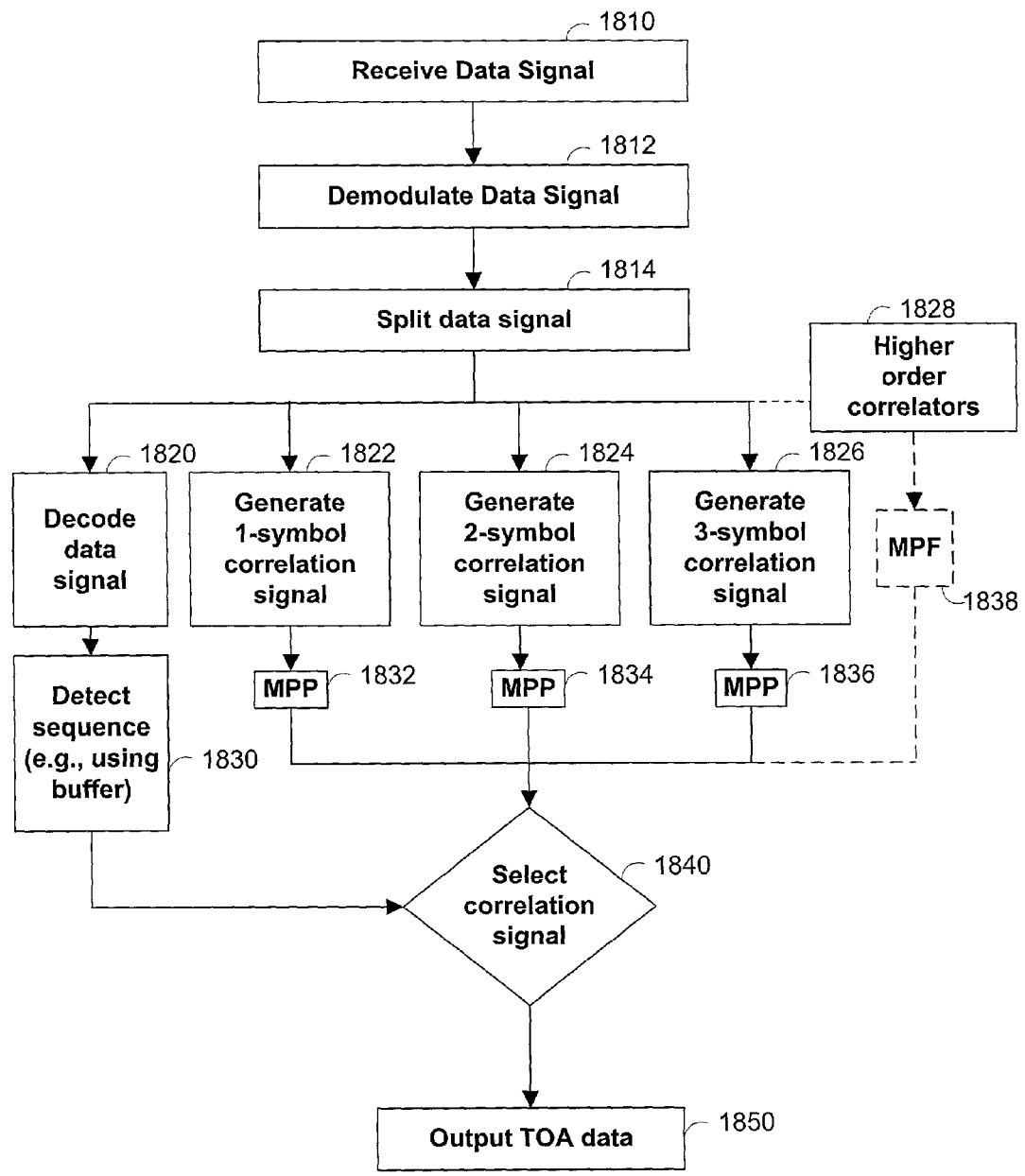
FIG. 18 is yet another flow chart showing illustrative steps that may be performed during wireless asset location identification in accordance with the principles of the invention.

FIG. 18 shows a general flowchart of illustrative steps involved in some embodiments of the present invention. The steps shown in FIG. 18 are only illustrative and may be performed in any suitable order. In practice, there may be additional steps or some of the steps may be deleted. Some of the steps shown in FIG. 18 may involve receiving wireless signals and processing signals. These and other steps may be performed using any suitable apparatus, including receivers such as receiver 110 shown in FIG. 1 and apparatus such as those included in TOA estimation device 200 shown in FIG. 2.

For clarity, the following discussion will describe the steps shown in FIG. 18 as being performed by "the system," which is intended to include any system suitable for performing the steps. The system may receive a data signal at step 1810. The data signal may be received from a wireless asset such as wireless asset 130 shown in FIG. 1 or wireless asset 350 shown in FIG. 3. The data signal may be demodulated at step 1812 to yield a demodulated signal. The demodulated signal may be similar to that described above in connection with FIG. 15. The demodulated signal may be split for parallel processing, which may include parallel correlation, and any other suitable processing, filtering, or buffering steps, at step 1814.

The demodulated signal, which may correspond to D(t) in equations (1) or (3), may be fed simultaneously to multiple correlators in steps 1820, 1822, 1824, 1826, and 1828. Steps 1822, 1824, and 1826, may allow 1-symbol, 2-symbol, and 3-symbol correlations to be performed simultaneously. The step 1822 correlation may use a reference signal that corresponds to R(t) in equation (1). The correlations of steps 1824–1828 may use reference signals that correspond to R'(t) in equation (3) because steps 1824–1828 may involve concatenated reference signals. Correlations involving sequences of information symbols longer than those in steps 1822–1826 may be performed in step 1828 concurrently with some or all of steps 1822–1826. In any of steps 1822–1828, the system may store a sufficient number of symbols to permit correlation using a set M of target symbols or a subset P of target symbols, as defined above in connection with FIG. 17.

The system may detect sequences in the demodulated data signal using steps 1820 and 1830. The system may decode the demodulated data signal at step 1820 using, for example, a 1-symbol correlator. The decoding correlator may be similar to or identical to a 1-symbol correlator that may be used in step 1822. As demodulated data stream through the decoder in step 1820, the resulting bits may be stored in a buffer for sequence detection in step 1830. After a sequence is detected, a correlation signal (e.g., produced in steps 1822–1828) based on a reference signal known to correlate strongly with the detected sequence may be selected in step 1840. Steps 1832–1838 are multipath processing steps ("MPP," in FIG. 18) that may be used to filter multipath signals out of correlation signals produced in steps 1822–1828, respectively.

In step 1850, the system may define a TOA estimate as an estimator such as $\hat{\tau}$ by maximizing the selected correlation function. In some embodiments, the correlation function may be defined in a manner that requires minimization to evaluate $\hat{\tau}$.

In some embodiments, the system may define a TOA estimate in steps 1832–1838 using leading edge detection, channel estimation, or a combination thereof. (Leading edge detection and channel estimation are discussed above, particularly in connection with FIGS. 15 and 15A.) In these embodiments, step 1840 may involve selecting a TOA estimate from the results of steps 1832–1838. In these embodiments, it may not be necessary in step 1850 to determine a TOA estimator such as $\hat{\tau}$ to define a TOA estimate.

Figure 19:
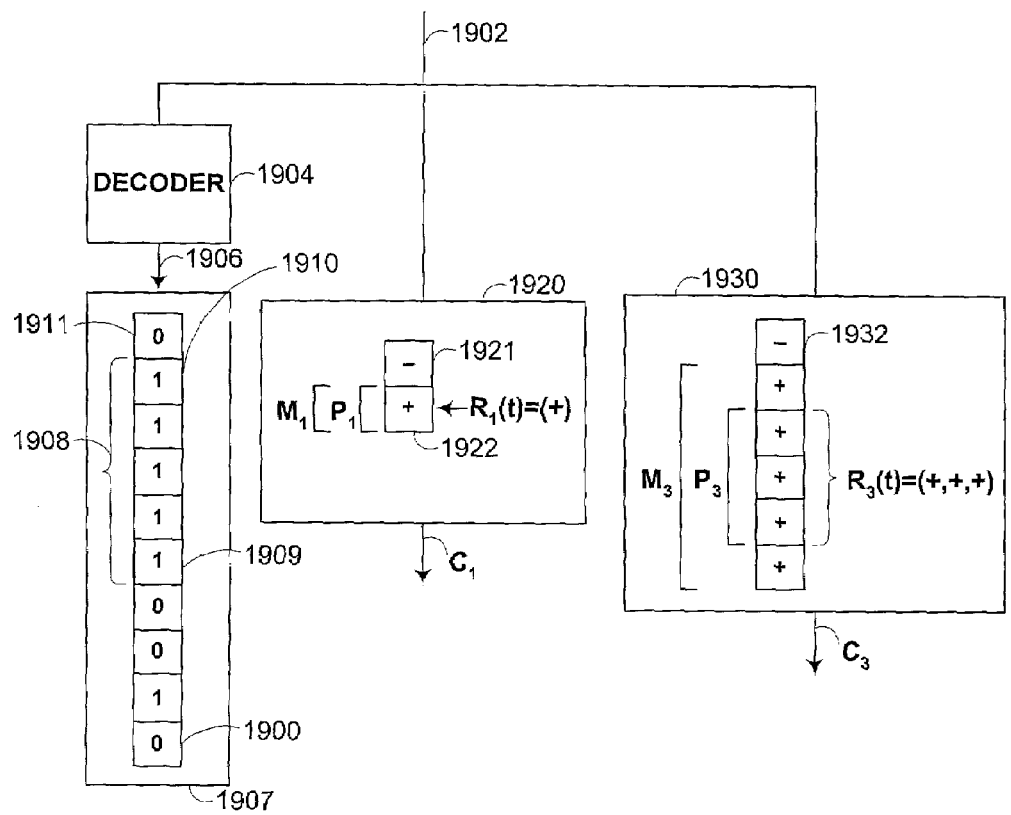
FIG. 19 is yet another flow chart showing illustrative steps that may be performed during wireless asset location identification in accordance with the principles of the invention.

FIG. 19 shows illustrative buffers 1900 (for decoded data), 1922 (for information symbols), and 1932 (for information symbols) that may be used to perform some of the steps shown in FIG. 18. Demodulated signal 1902 may be passed to decoder 1904, correlator 1920, and correlator 1930. Decoder 1904 may pass output 1906 to buffer 1900 in sequence detector 1907 for detection of a pattern such as 1908. In this illustrative example, pattern 1908 includes five consecutive identical bits, including initial bit 1909 and final bit 1910. Bit 1911, having a value different from those in pattern 1908, may signal the end of pattern 1908. One-symbol correlator 1920 and three-symbol correlator 1930, in respective buffers 1922 and 1932, may concurrently generate respective correlation signals $C_1$, and $C_3$. $M_1$, $P_1$, and $R_1$ and $M_3$, $P_3$, and $R_3$ correspond to M, P, and R shown in FIG. 17 for a one-symbol correlator and a three-symbol correlator, respectively.

The detection of pattern 1908 may be used to select one of the correlator outputs (e.g., $C_1$, or $C_3$) for use in TOA determination. In the example shown in FIG. 19, $C_3$ may be selected because $C_3$ may be expected to be stronger than $C_1$. $C_3$ may be stronger than $C_1$ because $C_3$ is based on correlation of a three symbol reference signal (R(t)) with a three symbol subset (P) centered on a five symbol subset (M). In contrast, $C_1$ is based on correlation of a one symbol reference signal ($R_1$(t)) with a one symbol subset (P) centered on a one symbol subset (M).

In some embodiments, sequence detector 1907 may be configured to change the criteria used to search for an information sequence in decoder output 1906. For example, detector 1907 may be programmed to search for a sequence of five consecutive identical symbols. If such a sequence is not detected after a predetermined number of bits is analyzed (or after a predetermined period of time has passed, or both) the decoder may automatically shift to a search for a pattern that is more likely to be found (e.g., a shorter pattern). In some embodiments, numerous search strategies may be used. In some embodiments, detector 1907 may have processing features and buffer capacity suitable for rescanning some or all of decoder output 1906 to identify different bit patterns.

Figure 20:
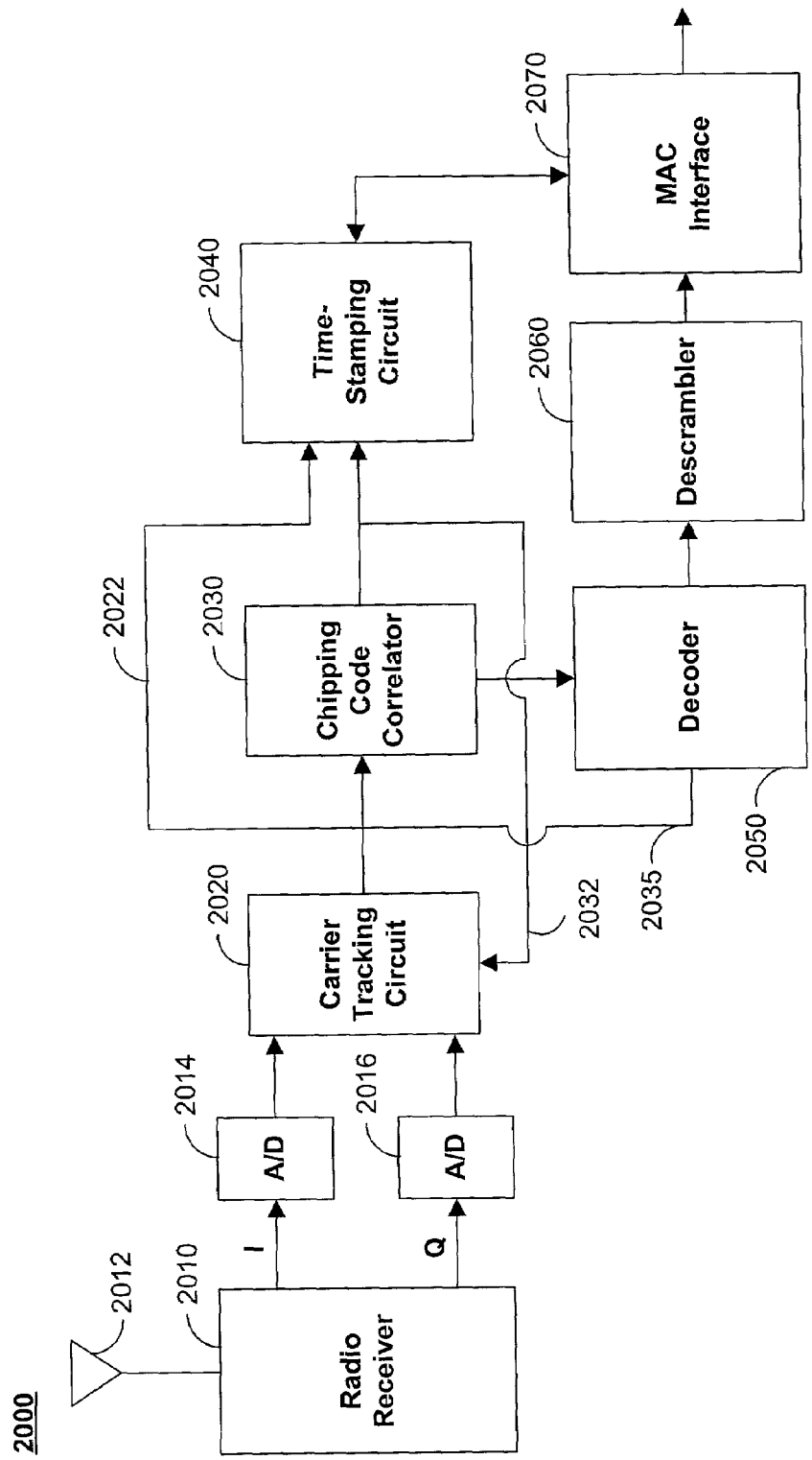
FIG. 20 shows illustrative apparatus that may be used in conjunction with a wireless asset location identification system in accordance with the principles of this invention.

FIG. 20 shows illustrative TOA estimation device 2000 that may be used to perform some of the steps shown in FIGS. 16 and 18. Radio receiver 2010 may be similar to receiver 110 shown in FIG. 1. Radio receiver 2010 may be similar to the combination of central processing unit 220 and radio module 230 shown in FIG. 2. Other components of system 2000 may integrated into processor 120 of system 100, timing module 240 of system 200, or any other suitable signal processing apparatus. System 2000 may be in communication with a communication network such as network 310 shown in FIG. 3.

Antenna 2012 may receive a communication sequence modulated on a carrier signal from a wireless asset such as wireless asset 130 shown in FIG. 1. Radio receiver 2010 may provide baseband in-phase (I) and quadrature (Q) signals, which may be digitized by A/D converters 2014 and 2016, respectively, to carrier tracking circuit 2020. Circuit 2020 may include carrier signal tracking and/or timing loops to synchronize system 2000 timing with the carrier signal. Tracking circuit 2020 may provide the synchronized communication sequence to chipping code correlator for decoding the communication sequence. Feedback loop 2032 may provide feedback to circuit 2020 for tracking control. Correlator 2030 may provide a correlation signal to decoder 2050. Decoder 2050 may decode high data rate modulation symbols received from tracking circuit 2020 via path 2035. High data rate modulation symbols may include 802.11 data structures such as PBCC, CCK, and any other suitable high data rate modulation symbol. Descrambler 2060 may be present to descramble decoded demodulated communication sequences. MAC interface 2070 may provide descrambled communication sequences to network resources.

Circuit 2020 may provide the synchronized communication sequence to time-stamping circuit 2040 for TOA estimation. By-pass 2022 may be present to permit circuit 2040 to perform tasks substantially in parallel with correlator 2030. Circuit 2040 may include one or more TOA estimate correlators. In some embodiments, circuit 2040 may perform data signal decoding step 1820 shown in FIG. 18. In some embodiments, circuit 2040 may perform steps shown in FIG. 18 such as sequence detection step 1830, multi-bit correlation steps 1822–1828, multipath processing steps 1832–1836, estimator selection step 1840, TOA data output step 1850, or any other steps suitable for time-stamping. MAC interface 2070 may receive a TOA estimate from circuit 2040 and provide the TOA estimate to network resources.

Figure 21:
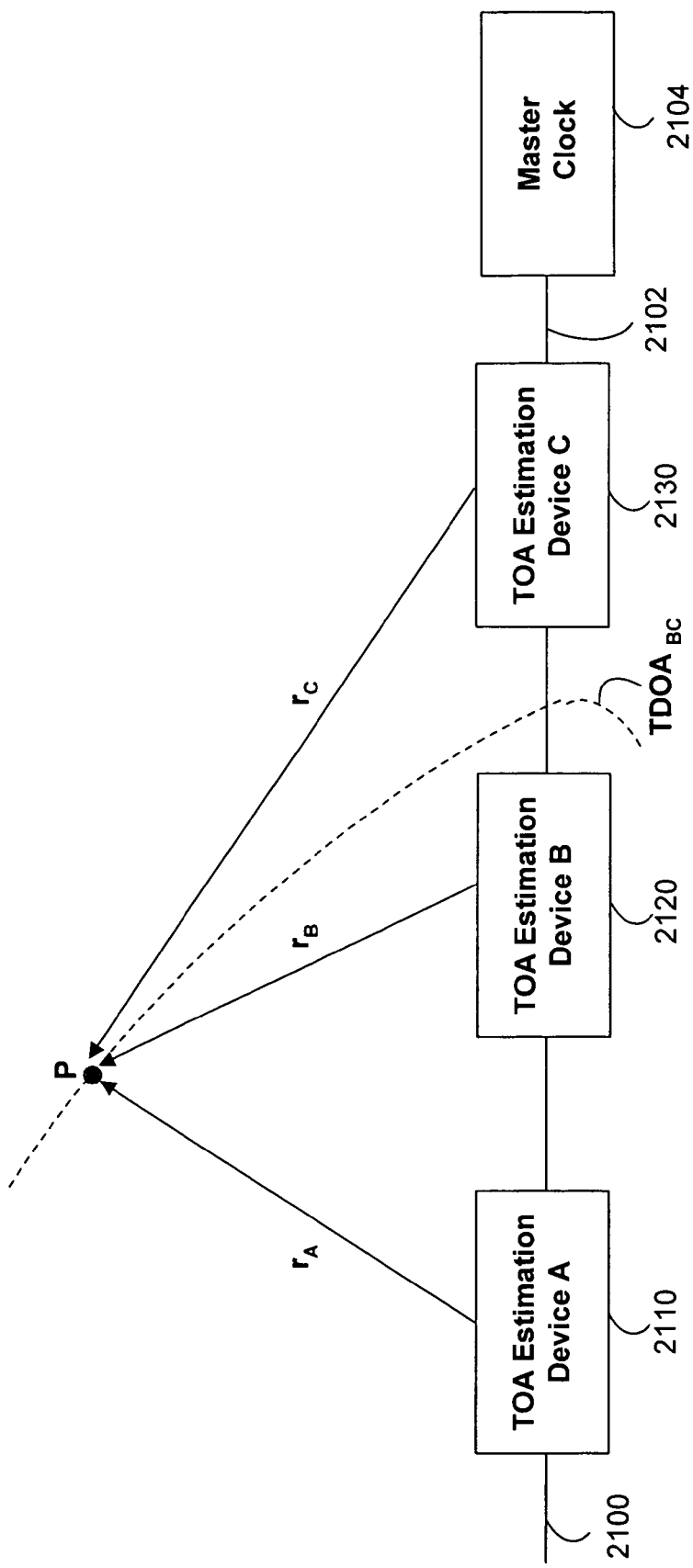
FIG. 21 is a schematic diagram of a portion of a wireless asset location identification system in accordance with the principles of this invention.

FIG. 21 shows illustrative network 2100 that may be used for identifying the location of a wireless asset. Network 2100 may include multiple TOA estimation devices. For the sake of simplicity, only three TOA estimation device A (2110), TOA estimation device B (2120), and TOA estimation device C (2130), are illustrated in FIG. 21. The TOA devices may be in electronic communication with cable 2102. A wireless asset may be located in as yet unidentified location P. The wireless asset may broadcast a communication sequence that may be received by TOA estimation devices A, B, and C. A TDOA for a given pair of TOA estimation devices can be used to generate a solution set (as discussed above) that may include point P. For example, $TDOA_{BC}$, which may be calculated for the communication sequence arriving at TOA estimation devices B and C, may be used to generate a hyperbola defined by the difference in distances between the wireless asset and each of systems B and C. The relationship between $TDOA_{BC}$ and the difference in distances may be given by $$TDOA_{BC} = \frac{1}{c}(r_B - r_C), \quad (4)$$

in which c is the speed of propagation of the communication sequence, $r_B$ is the distance between the wireless asset and TOA estimation device B, and $r_C$ is the distance between the wireless asset and TOA estimation device C. The quantity $(r_B - r_C)$ may then be used to define a curve (e.g., a hyperbola) that includes P or an estimate thereof. A second solution set that may include P may be generated, for example, using a TDOA generated using system pair A and B or system pair A and C. TOA estimates from additional TOA estimation devices (not shown) may be used to generate one or more solution sets for identifying location P.

Master clock 2104 may provide a synchronization signal via cable 2102 to the TOA estimation devices. The synchronization signal may be used to synchronize clocks, timers, or counters that may be present in the devices. The synchronization signal may send a reset pulse to the TOA estimation devices to force device clocks to reset simultaneously. When cable 2102 includes a power transmission line (e.g., an Ethernet DC power line), the synchronization signal may be transmitted using the power line. For example, the synchronization signal may be added or capacitively coupled to the DC power signal. When cable 2102 includes a data transmission line, the synchronization symbol may be transmitted using the data transmission line. For example, cable 2102 may include a twisted pair of wires (for example, an Ethernet data transmission line). The synchronization signal may be superimposed on data signals carried by the twisted pair. At the TOA estimation device the timing and data signals may be separated using filtering, common mode rejection, or a combination thereof. Different TOA estimation devices may have different fixed delays. For example, if the lengths of cable between clock 2104 and the TOA estimation devices are different, or if processing rates in the devices differ, TOA's generated by the devices may include offsets even after synchronization. Offsets may be quantified and TOA estimates automatically compensated before a TDOA is calculated. In some embodiments, a beacon may be provided for broadcasting a wireless synchronization signal to devices 2110–2130.

Figure 22:
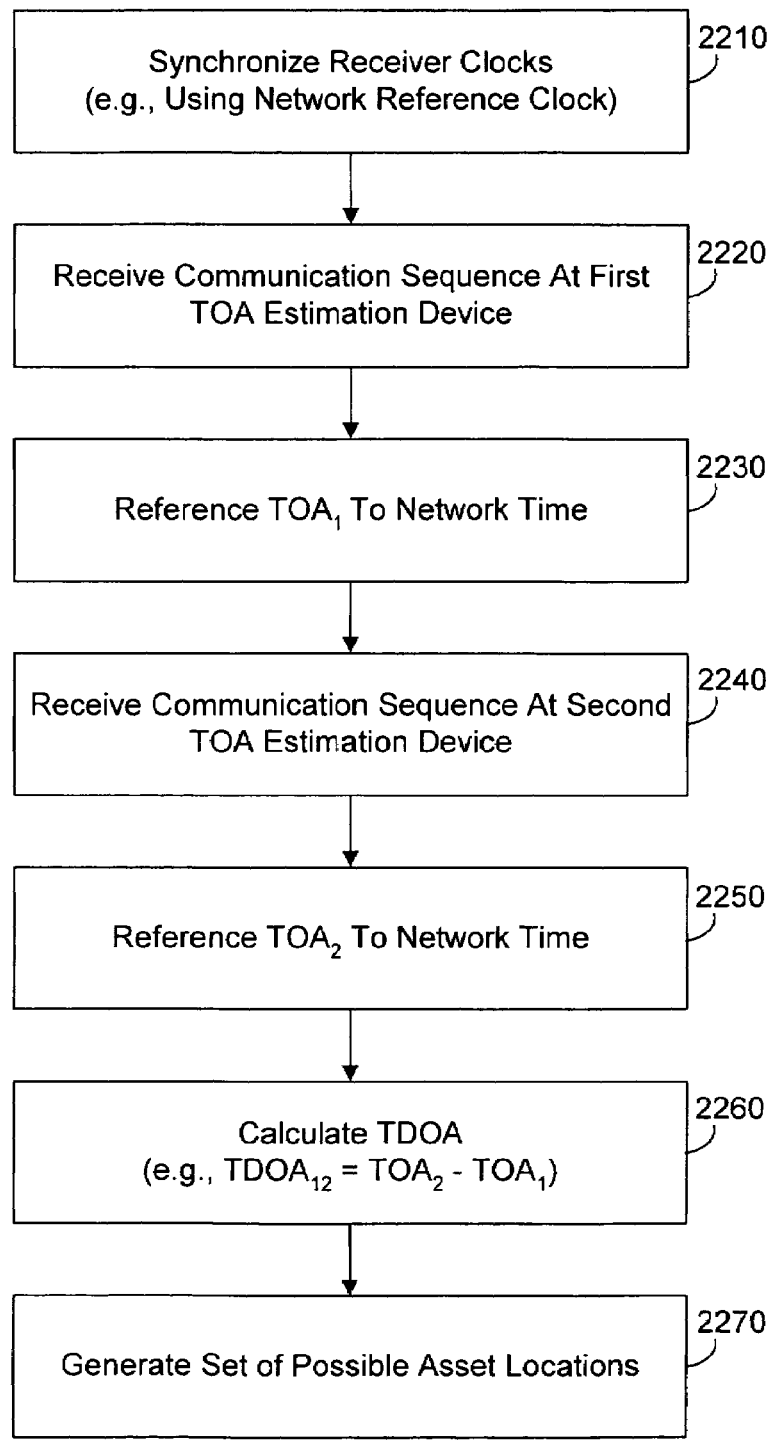
FIG. 22 is yet another flow chart showing illustrative steps that may be performed during wireless asset location identification in accordance with the principles of the invention.
Figure 23:
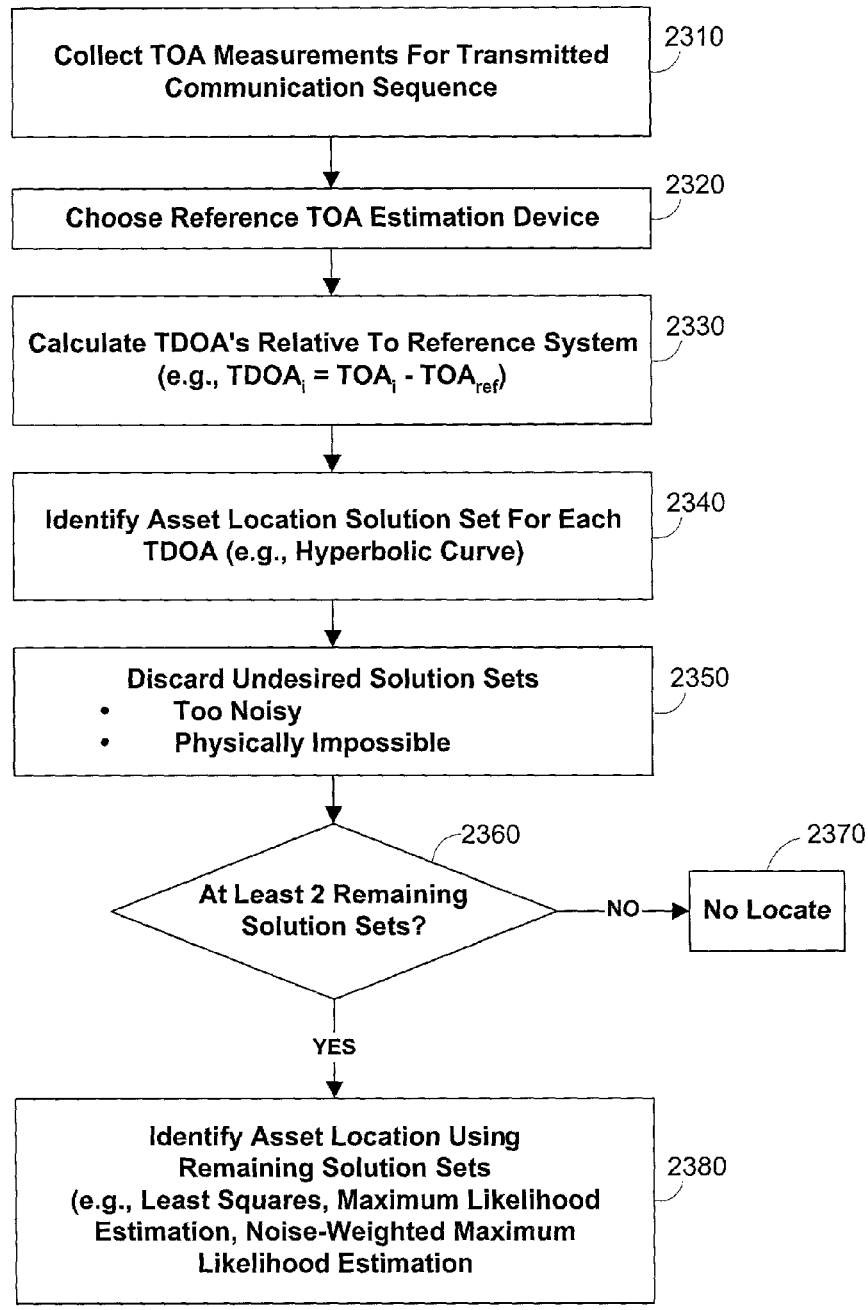
FIG. 23 is yet another flow chart showing illustrative steps that may be performed during wireless asset location identification in accordance with the principles of the invention.

FIGS. 22 and 23 show general flowcharts of illustrative steps involved in some embodiments of the invention related to wireless asset location identification using TDOA's. The steps shown in FIGS. 22 and 23 are only illustrative and may be performed in any suitable order. In practice, there may be additional steps or some of the steps may be deleted. Some of the steps shown in FIGS. 22 and 23 may involve receiving wireless signals and processing signals. These and other steps may be performed using any suitable apparatus, including system 100 (including, e.g., receiver 110) shown in FIG. 1 and system 200 shown in FIG. 2.

In step 2210, clocks of network TOA estimation devices to be used for wireless asset location identification may be synchronized to a selected network time signal or counter. In step 2220, a first TOA estimation device may receive a communication sequence from the wireless asset and generate $TOA_1$, (a first TOA estimate). In step 2230, $TOA_1$ may be referenced to network time. In step 2240, a second TOA estimation device may receive the communication sequence and generate $TOA_2$, (a second TOA estimate). $TOA_2$ may be referenced to network time in step 2250. In step 2260, a TDOA may be calculated using $TOA_1$ and $TOA_2$. A set of possible wireless asset locations may then be generated in step 2270. Steps 2210–2260 may be repeated to generate one or more additional solution sets of possible wireless asset locations.

FIG. 23 shows illustrative steps that may be performed when multiple TOA estimation devices may provide multiple TDOA estimates. In step 2310, TOA estimates generated in connection with a broadcast communication sequence may collected. In step 2320, a TOA estimation device may be designated as a reference TOA estimation device. In step 2330, TOA's from nonreference TOA estimation devices may be used in conjunction with the TOA generated by the reference system to calculate a TDOA for each of the nonreference systems. In some embodiments, more than one reference system may designated. In step 2340, each TDOA may be used to generate an asset location solution set. In step 2350, solution sets that are physically unreasonable or impossible ("out-of-bounds"), degraded by noise, or otherwise inferior may discarded. In step 2360, if at least two solution sets remain after selections are made in step 2350, wireless asset location may be identified using the remaining solution sets and a solution estimation method such as least squares estimation, maximum likelihood estimation, noise-weighted maximum likelihood estimation, or any other suitable estimation method. If fewer than 2 solution sets remain after step 2350, the process may proceed with step 2370, in which no location is identified.

Figure 24:
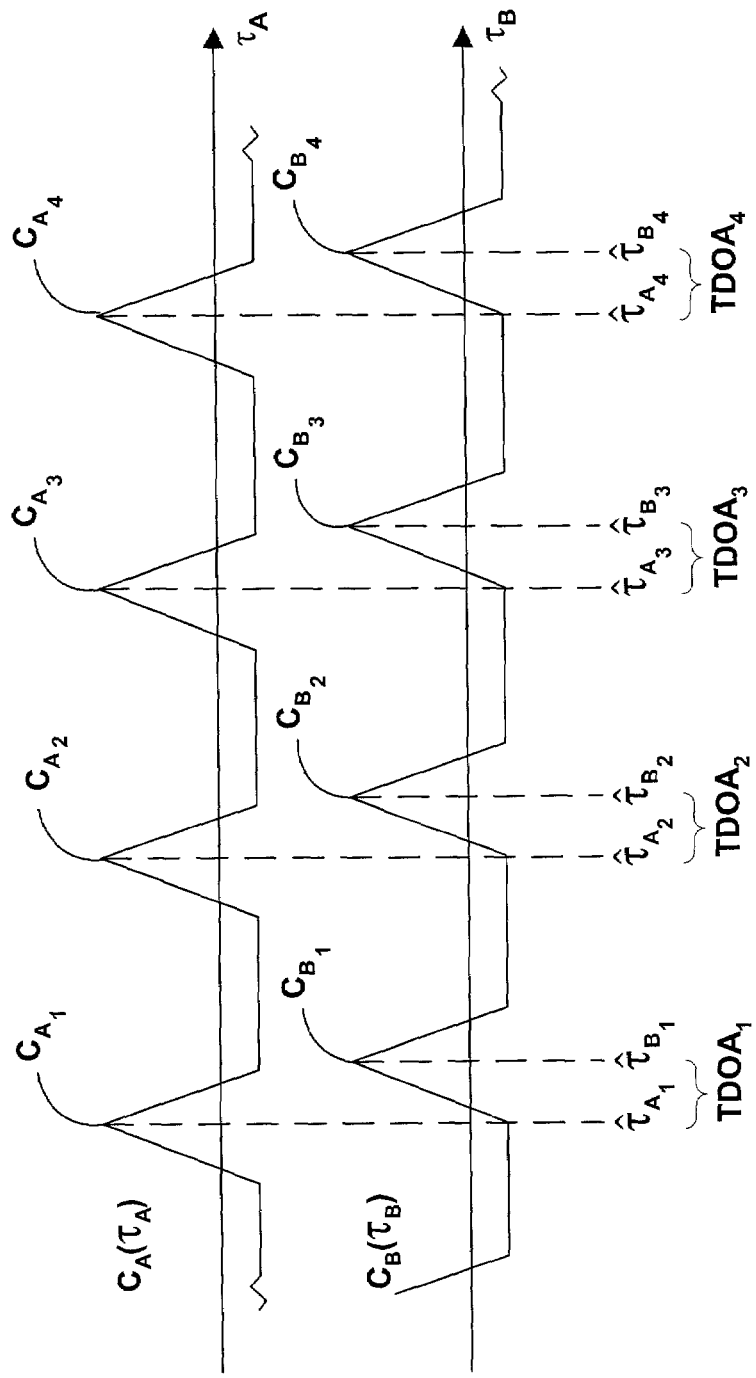
FIG. 24 shows two illustrative correlation signals that may be used in wireless asset location identification in accordance with the principles of the invention.

FIG. 24 shows illustrative correlation signals $C_A(\tau)$ and $C_B(\tau)$ associated with a communication sequence broadcast by a wireless asset. The communication signal may be received by multiple TOA estimation devices, each of which may generate a correlation signal. For example, $C_A(\tau)$ and $C_B(\tau)$ may be generated using TOA estimation devices such as A and B, respectively, shown in FIG. 21. $C_A(\tau)$ and $C_B(\tau)$ may be similar to $C(\tau)$ shown in FIG. 12. In FIG. 25, $C_A$ and $C_B$ depend on the time variables $\tau_A$ and $\tau_B$, respectively, which may be referenced to internal clocks or counters in systems A and B, respectively. These internal clocks may be synchronized so that $\tau_A$ and $\tau_B$ are synchronized and referenced to the same standard. $C_A$ may have peaks $C_{A_1}$, $C_{A_2}$, $C_{A_3}$, and $C_{A_4}$, for example, corresponding respectively to TOA estimators $\hat{\tau}_{A_1}$, $\hat{\tau}_{A_2}$, $\hat{\tau}_{A_3}$, and $\hat{\tau}_{A_4}$. $C_B$ may have peaks $C_{B_1}$, $C_{B_2}$, $C_{B_3}$ and $C_{B_4}$, for example, respectively corresponding to TOA estimators $\hat{\tau}_{B_1}$, $\hat{\tau}_{B_2}$, $\hat{\tau}_{B_3}$, and $\hat{\tau}_{B_4}$. The estimators may be determined using equation 1. Multiple TDOA's may be generated using pairs of TOA estimators including estimators from both systems A and B. For example, $TDOA_1$, shown in FIG. 24, may be generated from $\hat{\tau}_{A_1}$ and $\hat{\tau}_{A_2}$. $TDOA_2$ may be generated from $\hat{\tau}_{A_2}$ and $\hat{\tau}_{B_1}$. Although four TDOA's are shown in FIG. 24, some embodiments may generate more than four TDOA's. Although the TDOA's shown in FIG. 24 are based on TOA estimates such as $\hat{\tau}_{A_1}$ and $\hat{\tau}_{B_1}$, some embodiments may use TOA estimates based on leading edge detection, channel estimation, or a combination thereof for calculating an average TDOA. The TDOA's shown in FIG. 24 may be referred to as "preliminary TDOA's". In some embodiments, the average of the preliminary TDOA's may be used to generate a solution set of possible asset locations for the wireless asset as discussed in reference to FIGS. 21–23.

Thus it is seen that apparatus and methods for identifying wireless asset location in a wireless communication network have been provided. One skilled in the art will appreciate that the present invention can be practiced by other than the described embodiments, which are presented for purposes of illustration and not of limitation, and the present invention is limited only by the claims which follow.

What is claimed is:

1. A mobile unit for providing location identification signals, said location identification signals useful for determining location of a mobile asset in a communication network, said mobile unit comprising:
   a receiver;
   a transmitter; and
   a controller;
   wherein said controller is responsive to wake up signals received by said receiver to operate said receiver to determine if radio frequency energy in a first channel in a first cell of a cellular network is substantially less than a predetermined threshold, and to cause said transmitter to transmit said location identification signals on said first channel if radio frequency energy in said first channel is substantially less than a predetermined threshold:
   wherein said controller is responsive to said receiver, if said radio frequency energy in said first channel is not substantially less than said threshold, to cause said receiver to detect the presence of radio frequency energy in a second channel in a second cell of said cellular network; and
   wherein said controller is responsive to said receiver, if radio frequency energy in said second channel is substantially less than a predetermined threshold, to cause said transmitter to transmit said location identification information on said second channel.

2. A mobile unit for providing location identification signals, said location identification signals useful for determining location of a mobile asset in a communication network, said mobile unit comprising:
   a transmitter;
   a controller for delaying a predetermined period of time;
   a receiver for detecting the presence of radio frequency energy on a first channel in a first cell of a cellular network in response to said controller;
   wherein said controller is responsive to said receiver, if said radio frequency energy is substantially less than a predetermined threshold, to cause said transmitter to transmit said location identification signals on said first channel:
   wherein said controller is responsive to said receiver, if said radio frequency energy on said first channel is not substantially less than said threshold, to cause said receiver to detect the presence of radio frequency energy on a second channel in a second cell of said cellular network; and
   wherein said controller is responsive to said receiver, if radio frequency energy on said second channel is substantially less than a predetermined threshold, to cause said transmitter to transmit said location identification signals on said second channel.

3. The mobile unit of claim 2 wherein said transmitter is configured to transmit at least one information sequence selected for time-of-arrival estimation.

4. The mobile unit of claim 2 wherein said transmitter is configured to transmit asset identification information.

5. The mobile unit of claim 2 wherein said transmitter is configured to transmit an 802.11 data packet.

6. The mobile unit of claim 2 wherein said receiver comprises an energy detector.

7. A method for providing location identification signals, said location identification signals useful for determining location of a mobile asset in a communication network, said method comprising:
   receiving a wake-up signal from a transmitter in said network;
   detecting the presence of radio frequency energy on a first channel in a first cell of a cellular network in response to said wake-up signal;
   if said radio frequency energy is substantially less than a predetermined threshold, transmitting said location identification signals on said first channel;
   if said radio frequency energy on said first channel is not substantially less than said threshold, detecting the presence of radio frequency energy on a second channel in a second cell of said cellular network; and
   if radio frequency energy on said second channel is substantially less than a predetermined threshold, transmitting said location identification signals on said second channel.

8. The method of claim 7 wherein said transmitting comprises transmitting at least one information sequence selected for time-of-arrival estimation.

9. The method of claim 7 wherein said transmitting comprises transmitting asset identification information.

10. The method of claim 7 wherein said transmitting comprises transmitting an 802.11 data packet.

11. A method for providing location identification signals, said location identification signals useful for determining location of a mobile asset in a communication network, said method comprising:
   waiting a predetermined period of time;
   detecting the presence of radio frequency energy on a first channel in a first cell of a cellular network;
   if said radio frequency energy is substantially less than a predetermined threshold, transmitting said location identification signals on said first channel;
   if said radio frequency energy on said first channel is not substantially less than said threshold, detecting the presence of radio frequency energy on a second channel in a second cell of said cellular network; and
   if radio frequency energy on said second channel is substantially less than a predetermined threshold, transmitting said location identification signals on said second channel.

12. The method of claim 11 wherein said transmitting comprises transmitting at least one information sequence selected for time-of-arrival estimation.

13. The method of claim 11 wherein said transmitting comprises transmitting asset identification information.

14. The method of claim 11 wherein said transmitting comprises transmitting an 802.11 data packet.

15. The method of claim 11 wherein said detecting comprises using an energy detector.

* * * * *